United States Patent
Furuike et al.

(10) Patent No.: US 10,328,350 B2
(45) Date of Patent: Jun. 25, 2019

(54) ATTACHMENT AND CONTROL SYSTEM

(71) Applicant: NINTENDO CO., LTD., Kyoto (JP)

(72) Inventors: Hironori Furuike, Kyoto (JP);
Yasuhiro Inoue, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 56 days.

(21) Appl. No.: 15/292,359

(22) Filed: Oct. 13, 2016

(65) Prior Publication Data

US 2018/0099225 A1 Apr. 12, 2018

(30) Foreign Application Priority Data

Oct. 6, 2016 (JP) .................. 2016-198338

(51) Int. Cl.
*A63F 13/24* (2014.01)
*A63F 13/98* (2014.01)
*A63F 13/235* (2014.01)

(52) U.S. Cl.
CPC ............ *A63F 13/98* (2014.09); *A63F 13/235* (2014.09); *A63F 13/24* (2014.09)

(58) Field of Classification Search
CPC ........ A63F 13/98; A63F 13/235; A63F 13/24; A63F 13/02; A63F 13/245; A63F 2300/1043; A63F 2300/1062
See application file for complete search history.

(56) References Cited

U.S. PATENT DOCUMENTS 5,052,937 A 10/1991 Glen
5,276,733 A 1/1994 Uno et al.
(Continued)

FOREIGN PATENT DOCUMENTS

CN 104 436 646 3/2015
CN 104383683 A 3/2015
(Continued)

OTHER PUBLICATIONS

Phonejoy Play smartphone game controller hits Kickstarter, http://www.slashgear.com/phonejoy-play-smartphone-game-controller-hits-kickstarter-05259565/; downloaded Nov. 10, 2016, 9 pages.
(Continued)

*Primary Examiner* — James S. McClellan
*Assistant Examiner* — Peter J Iannuzzi
(74) *Attorney, Agent, or Firm* — Nixon & Vanderhye P.C.

(57) ABSTRACT

An example attachment is attachable to a game controller including a controller-side slide portion on which a controller-side operation button is provided. The attachment includes an attachment-side slide portion and an attachment-side operation button. The attachment-side slide portion is provided on a first surface of the attachment, wherein the attachment-side slide portion is configured to slidably engage with the controller-side slide portion in a predetermined slide direction, and wherein the controller-side slide portion is insertable into the attachment-side slide portion from a first side in the slide direction. The attachment-side operation button is capable of protruding from a second surface on a reverse side from the first surface. The attachment-side operation button includes a actuation portion capable of protruding from the first surface, thereby pressing the controller-side operation button, in response to an operation of pressing the attachment-side operation button.

49 Claims, 20 Drawing Sheets

(56) References Cited

U.S. PATENT DOCUMENTS

| | | | |
|---|---|---|---|
| 5,515,174 A | 5/1996 | Abe et al. | |
| 5,627,974 A | 5/1997 | Watts | |
| 5,657,459 A | 8/1997 | Yanagisawa et al. | |
| 5,667,220 A | 9/1997 | Cheng | |
| 5,702,305 A | 12/1997 | Norman et al. | |
| 6,512,511 B2 | 1/2003 | Willner | |
| 6,530,838 B2 | 3/2003 | Ha | |
| 6,580,420 B1 | 6/2003 | Wang | |
| 6,788,285 B2 | 9/2004 | Paolucci | |
| 7,095,442 B2 | 8/2006 | Van Zee | |
| 7,733,637 B1 | 6/2010 | Lam | |
| 7,833,097 B1 | 11/2010 | Maddox | |
| 8,057,309 B1* | 11/2011 | Mead | A63F 9/00 463/48 |
| 8,298,084 B2 | 10/2012 | Yee | |
| 8,497,659 B2 | 7/2013 | Navid | |
| 8,845,425 B2 | 9/2014 | Nogami | |
| 8,939,838 B2 | 1/2015 | Alten | |
| 8,972,617 B2 | 3/2015 | Hirschman | |
| 9,757,647 B2 | 9/2017 | Fujita et al. | |
| 2001/0045938 A1 | 11/2001 | Willner | |
| 2002/0119819 A1 | 8/2002 | Kunzle | |
| 2002/0145590 A1 | 10/2002 | Paolucci et al. | |
| 2002/0167696 A1 | 11/2002 | Edwards et al. | |
| 2003/0083130 A1 | 5/2003 | Toyoshima | |
| 2003/0100263 A1 | 5/2003 | Tanaka et al. | |
| 2003/0100340 A1 | 5/2003 | Cupps et al. | |
| 2003/0109314 A1 | 6/2003 | Ku | |
| 2004/0082361 A1 | 4/2004 | Rajagopalan | |
| 2004/0263471 A1 | 12/2004 | Hsieh | |
| 2005/0012711 A1 | 1/2005 | Paolucci et al. | |
| 2005/0085301 A1 | 4/2005 | Hammond | |
| 2006/0117623 A1 | 6/2006 | Watanabe | |
| 2006/0152484 A1 | 7/2006 | Rolus | |
| 2006/0176277 A1 | 8/2006 | Daniel et al. | |
| 2006/0237209 A1 | 10/2006 | Horinouchi | |
| 2006/0279039 A1 | 12/2006 | Krieger | |
| 2007/0021210 A1 | 1/2007 | Tachibana | |
| 2007/0045392 A1 | 3/2007 | Youens | |
| 2007/0111801 A1 | 5/2007 | Haber | |
| 2007/0112989 A1 | 5/2007 | Iwaki | |
| 2007/0131727 A1 | 6/2007 | Martuccio | |
| 2007/0178966 A1 | 8/2007 | Pohlman | |
| 2007/0218988 A1 | 9/2007 | Lucich | |
| 2007/0293318 A1 | 12/2007 | Tetterington | |
| 2008/0002350 A1 | 1/2008 | Farrugia | |
| 2008/0015017 A1* | 1/2008 | Ashida | A63F 13/02 463/37 |
| 2008/0064500 A1 | 3/2008 | Satsukawa et al. | |
| 2008/0153593 A1 | 6/2008 | Ikeda | |
| 2009/0005164 A1 | 1/2009 | Chang | |
| 2009/0036189 A1 | 2/2009 | Wang | |
| 2009/0069096 A1 | 3/2009 | Nishimoto | |
| 2009/0070093 A1 | 3/2009 | Nakanishi et al. | |
| 2009/0072784 A1 | 3/2009 | Erickson | |
| 2009/0079705 A1 | 3/2009 | Sizelove | |
| 2009/0093307 A1 | 4/2009 | Miyaki | |
| 2009/0111508 A1 | 4/2009 | Yeh | |
| 2009/0291760 A1 | 11/2009 | Hepburn | |
| 2009/0318227 A1* | 12/2009 | Nakajima | A63F 13/02 463/35 |
| 2010/0007528 A1 | 1/2010 | Urata et al. | |
| 2010/0009754 A1 | 1/2010 | Shimamura et al. | |
| 2010/0064883 A1 | 3/2010 | Gynes | |
| 2010/0118195 A1 | 5/2010 | Eom | |
| 2010/0178981 A1* | 7/2010 | Holcomb | A63B 21/0603 463/37 |
| 2010/0195279 A1 | 8/2010 | Michael | |
| 2010/0216547 A1 | 8/2010 | Coppard et al. | |
| 2010/0267454 A1* | 10/2010 | Navid | A63F 13/24 463/37 |
| 2010/0304873 A1* | 12/2010 | Markowitz | A63F 13/812 463/47 |
| 2011/0216495 A1 | 9/2011 | Marx | |
| 2011/0230261 A1 | 9/2011 | Kim | |
| 2011/0260969 A1 | 10/2011 | Workman | |
| 2012/0058821 A1 | 3/2012 | Lan | |
| 2012/0063625 A1 | 3/2012 | Barber et al. | |
| 2012/0088582 A1 | 4/2012 | Wu et al. | |
| 2012/0106041 A1* | 5/2012 | Ashida | A63F 13/06 361/679.01 |
| 2012/0113034 A1 | 5/2012 | McDermid | |
| 2012/0176369 A1 | 7/2012 | Suzuki et al. | |
| 2012/0188691 A1 | 7/2012 | Zhou | |
| 2012/0202597 A1 | 8/2012 | Yee et al. | |
| 2012/0271967 A1 | 10/2012 | Hirschman | |
| 2012/0302347 A1 | 11/2012 | Nicholson | |
| 2012/0302348 A1* | 11/2012 | Karacal | A63F 13/837 463/38 |
| 2012/0326984 A1 | 12/2012 | Ghassabian | |
| 2013/0058659 A1 | 3/2013 | Umezu et al. | |
| 2013/0095925 A1 | 4/2013 | Xu | |
| 2013/0106687 A1 | 5/2013 | Baum et al. | |
| 2013/0109476 A1 | 5/2013 | Baum et al. | |
| 2013/0120258 A1 | 5/2013 | Maus | |
| 2013/0154542 A1 | 6/2013 | Joynes et al. | |
| 2013/0194190 A1 | 8/2013 | Lysenko | |
| 2013/0267322 A1 | 10/2013 | South | |
| 2013/0279106 A1 | 10/2013 | Ergun | |
| 2013/0335904 A1 | 12/2013 | Griffin | |
| 2014/0121023 A1 | 5/2014 | Tahara et al. | |
| 2014/0200085 A1 | 7/2014 | Bares | |
| 2014/0206451 A1 | 7/2014 | Helmes | |
| 2014/0221098 A1 | 8/2014 | Boulanger | |
| 2014/0235359 A1 | 8/2014 | Navid | |
| 2014/0247246 A1 | 9/2014 | Maus | |
| 2014/0274394 A1 | 9/2014 | Willis | |
| 2014/0370988 A1 | 12/2014 | Shimamura et al. | |
| 2014/0374457 A1 | 12/2014 | Piccolo | |
| 2015/0018101 A1 | 1/2015 | Schoenith et al. | |
| 2015/0084900 A1 | 3/2015 | Hodges | |
| 2015/0149668 A1* | 5/2015 | Joynes | A63F 13/23 710/62 |
| 2015/0281422 A1 | 10/2015 | Kessler | |
| 2016/0001176 A1 | 1/2016 | Chen | |
| 2016/0107082 A1 | 4/2016 | Song | |
| 2016/0149426 A1 | 5/2016 | Hodges | |
| 2016/0231773 A1 | 8/2016 | Inoue et al. | |
| 2018/0099225 A1 | 4/2018 | Furuike et al. | |

FOREIGN PATENT DOCUMENTS

| | | | | |
|---|---|---|---|---|
| EP | 1 759 745 | | 3/2007 | |
| EP | 2 018 030 | | 1/2009 | |
| EP | 2 258 456 | | 12/2010 | |
| EP | 2 772 825 | | 9/2014 | |
| GB | 2 310 483 | | 8/1997 | |
| GB | 2 522 008 | | 7/2015 | |
| JP | 63-53873 | | 3/1988 | |
| JP | 06-077387 | | 10/1994 | |
| JP | 7-30429 U | | 6/1995 | |
| JP | 2002-182856 | | 6/2002 | |
| JP | 3089139 U | | 7/2002 | |
| JP | 2003-18275 | | 1/2003 | |
| JP | 2004-313492 | | 11/2004 | |
| JP | 2007054114 A | * | 3/2007 | A63F 13/24 |
| JP | 4255510 | | 4/2009 | |
| JP | 2010-20742 | | 1/2010 | |
| JP | 2014-89578 A | | 5/2014 | |
| JP | 6153238 B1 | | 6/2017 | |
| KR | 2003-0021435 | | 3/2003 | |
| WO | WO 2013/095703 | | 6/2013 | |
| WO | 2015/006680 | | 1/2015 | |
| WO | 2015/014663 | | 2/2015 | |
| WO | 2017/088739 A1 | | 6/2017 | |

OTHER PUBLICATIONS

Wikipad Gaming Tablet, http://www.gizorama.com/2013/news/wikipad-gaming-tablet-available-june-11; downloaded Nov. 10, 2016, 4 pages.

(56) References Cited

OTHER PUBLICATIONS

IFrogz's Caliber Advantage, https://www.engadget.com/2013/01/11/ifrogz-caliber-advantage-iphone-gaming-case-hands-on/; downloaded Nov. 10, 2016, 7 pages.
Moga Ace Power iOS Game Controller, http://www.ign.com/articles/2013/11/20/moga-ace-power-ios-game-controller-now-available; downloaded Nov. 10, 2016, 6 pages.
PowerShell Controller + Battery, http://support.logitech.com/en_us/product/powershell-controller-and-battery; downloaded Nov. 10, 2016, 2 pages.
Game grip STG-ONE, http://gamegrip-stgone.com/en/index.php; downloaded Nov. 10, 2016, 7 pages.
PG-9023, http://www.ipega.hk/index.php?option=com_phocagallery&view=detail&catid=11%3Aiphone&id=1100%3Abluetooth-stretch-controller&Itemid=4&lang=en; downloaded Nov. 10, 2016, 2 pages.
Mad Catz Gamepads for Android and IOS, http://madcatz.com/gamesmart_lynx_9/; downloaded Nov. 10, 2016, 4 pages.
Gametel bluetooth controller for Android and iOS, https://www.engadget.com/2012/01/09/gametel-bluetooth-controller-for-android-and-ios-hands-on/; downloaded Nov. 10, 2016, 7 pages.
Smacon-GP, http://dragonquestgame.net/use-bluetooth-controller-smacon/; downloaded Nov. 10, 2016, 9 pages.
Samsung Galaxy S4 Game Pad, http://www.geeky-gadgets.com/samsung-galaxy-s4-game-pad-21-03-2013/; downloaded Nov. 10, 2016, 5 pages.
PowerA's Moga Pro . . . , http://venturebeat.com/2013/01/14/poweras-moga-pro-gives-you-a-console-gaming-experience-wherever-you-go -hands-on-video/; downloaded Nov. 10, 2016, 5 pages.
IPEGA PG-9017 Wireless Bluetooth Controller, http://www.infinityreviews.com/2013/04/ipega-bluetooth-controller-review.html; downloaded Nov. 10, 2016, 13 pages.
BladePad, http://www.bladepad.com/; downloaded Nov. 10, 2016, 2 pages.
Razer Goes Mobile with Junglecat iOS Gaming Controller, http://www.razerzone.com/press/detail/press-releases/razer-goes-mobile-with-junglecat-ios-gaming-controller; downloaded Nov. 10, 2016, 5 pages.
Office Action dated Jun. 2, 2017 issued in co-pending U.S. Appl. No. 15/418,426 (20 pgs.).
Office Action dated Feb. 9, 2018 issued in U.S. Appl. No. 15/418,426 (13 pgs.).
Office Action dated Apr. 12, 2018 issued in Ikuta, et al., U.S. Appl. No. 15/446,346 (11 pages).
Koizumi, Office Action dated May 18, 2017, issued in corresponding U.S. Appl. No. 15/344,208, filed Nov. 4, 2016 (16 pages).
Koizumi, Office Action dated May 19, 2017, issued in corresponding U.S. Appl. No. 15/344,276, filed Nov. 4, 2016 (13 pages).
O-iPower, Sony Official Cradle, Jan. 2, 2015, https://www.youtube.com/watch?v=11y5pOxOPmU, (1 page).
Koizumi, et al., U.S. Appl. No. 15/179,022, filed Jun. 10, 2016, (210 pages).
Fujita, et al., U.S. Appl. No. 15/178,972, filed Jun. 10, 2016, (290 pages).
Iwao, et al., U.S. Appl. No. 15/178,984, filed Jun. 10, 2016, (358 pages).
Fujita, et al., U.S. Appl. No. 15/179,011, filed Jun. 10, 2016, (323 pages).
Fujita et al., U.S. Appl. No. 15/178,991, filed Jun. 10, 2016, (321 pages).
European Search Report dated Nov. 17, 2016 issued in corresponding European Application No. 16173840.6 (4 pgs.).
Extended European Search Report dated Nov. 16, 2016 issued in corresponding European Application No. 16173842.2 (8 pgs.).
Fujita et al., U.S. Appl. No. 15/178,972, filed Jun. 10, 2016 (320 pages).
European Search Report dated Feb. 23, 2017, issued in EP 16173843.0 (11 pages).
Iwao, Office Action dated Mar. 13, 2017, issued in U.S. Appl. No. 15/428,188 (17 pages).
Ikuta et al., U.S. Appl. No. 15/446,346, filed Mar. 1, 2017 (99 pages).
Office Action dated Dec. 5, 2017 issued in U.S. Appl. No. 15/344,208 (24 pgs.).
European Search Report dated Dec. 8, 2017, issued in corresponding European Application No. 17191339.5 (5 pages).
Office Action dated Sep. 27, 2017 issued in U.S. Appl. No. 15/344,276 (16 pgs.).
Extended European Search Report dated Nov. 8, 2017, issued in corresponding EP Application No. 17188271.5 (9 pages).
European Search Report dated Apr. 7, 2017 issued in corresponding EP Application No. 16173964.4 (6 pgs.).
Fujita, Notice of Allowance dated Mar. 31, 2017, issued in U.S. Appl. No. 15/179,011 (11 pages).
European Search Report dated Jan. 2, 2017 issued in corresponding European Application No. 16193339.5 (4 pgs.).
Office Action dated Sep. 26, 2017 issued in U.S. Appl. No. 15/418,426 (14 pgs.).
European Search Report dated Nov. 3, 2016, issued in EP Application No. 16173841.4 (8 pages).
Nov. 2, 2018 Office Action issued in Chinese Application No. 201680002061.9 (with English-language translation).
Aug. 3, 2018 Notice of Reasons for Refusal issued in Japanese Patent Application 2017-127616.
Anonymous, "Wii Remote Configurations/Wii/Support/Nintendo", Nov. 20, 2006.
Sep. 17, 2018 Communication pursuant to Article 94(3) EPC issued in European Application No. 16 173 843.0.
Office Action dated Jun. 14, 2018 issued in Koizumi, et al., U.S. Appl. No. 15/344,208, filed Nov. 4, 2016 (19 pages).
Feb. 27, 2019 Notice of Reasons for Refusal issued in Japanese Application No. 2017-011929.
Apr. 15, 2019 Extended European Search Report issued in European Application No. 18207863.4.

* cited by examiner

ATTACHMENT AND CONTROL SYSTEM

CROSS REFERENCE TO RELATED APPLICATION

The disclosure of Japanese Patent Application No. 2016-198338 filed on Oct. 6, 2016 is incorporated herein by reference.

FIELD

The present technology relates to an attachment that can be attached to a controller.

BACKGROUND AND SUMMARY

There are conventional attachments, which are used while they are attached to controllers. When such an attachment is used while it is attached to a controller, a strap is sometimes fastened to the controller (or to the attachment).

When a strap is fastened to a controller, it is desirable that it is easy to remove the strap.

Thus, the present application discloses an attachment from which a strap can be removed easily, and a control system including the same.

(1)

An example attachment described herein is attachable to a game controller including a controller-side slide portion that includes a controller-side first operation button and a controller-side second operation button. The attachment includes a strap, an attachment-side slide portion, a stopper portion, a lock portion, an attachment-side first operation button and an attachment-side second operation button.

The attachment-side slide portion is on a first surface of the attachment, the attachment-side slide portion having a first side of a center of the attachment-side slide portion and a second side of the center of the attachment-side slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side. The stopper portion is on the second side of the center of the attachment-side slide portion and configured to limit a slide movement, in an insertion direction, of the controller-side slide portion which has been inserted from the first side of the attachment-side slide portion. The lock portion is configured to resist the slide movement, in a removal direction opposite to the insertion direction, while the slide movement of the controller-side slide portion is substantially limited by the stopper portion. The attachment-side first operation button is on a second surface on a reverse side from the first surface. The attachment-side second operation button is on the second surface. The attachment-side first operation button includes a first actuation portion configured to move from a first position to a second position, thereby pressing the controller-side first operation button, in response to an operation of pressing the attachment-side first operation button. The attachment-side second operation button includes a second actuation portion configured to move from a third position to a fourth position, thereby pressing the controller-side second operation button, in response to an operation of pressing the attachment-side second operation button.

(2)

The attachment further may include a strap anchor to which the strap can be fastened. The strap anchor is on a portion of the attachment which is on the same side of a center of the attachment in the slide direction as the first side.

(3)

The lock portion may be on the second side of the center of the attachment-side slide portion, and have a shape configured to engage with a projection on the game controller while the slide movement of the controller-side slide portion is substantially limited by the stopper portion.

(4)

The attachment-side slide portion may include a bottom surface, two side surfaces and two opposing portions. The bottom surface is substantially parallel to the slide direction. The two side surfaces are each substantially parallel to the slide direction and extend from opposite sides of the bottom surface. The two opposing portions extend from the two side surfaces, respectively, and each have a surface opposing the bottom surface. The lock portion is part of each of the two opposing portions.

(5)

The lock portion may include a contact surface with which a surface of the projection that is facing the first side is in contact while the slide movement of the controller-side slide portion is substantially limited by the stopper portion. The contact surface may be part of a boundary of a gap between the two opposing portions that gradually narrows toward the first side.

(6)

The lock portion may include a projection on the first side of the center of the attachment-side slide portion, and the projection is configured to engage with the controller-side slide portion while the slide movement is substantially limited by the stopper portion.

(7)

The projection may include a surface on the first side and sloped so that a height of the surface relative to the first side gradually decreases toward the first side.

(8)

The projection may be movable between a fifth position and a sixth position. The projection in the fifth position protrudes more than the projection in the sixth position, thereby engaging with the controller-side slide portion while the slide movement is substantially limited by the stopper portion. The attachment may further include an operation section movable between a seventh position and an eighth position through an operation by a user. The operation section in the seventh position limits movement of the projection from the fifth position to the sixth position, and the operation section in the eighth position allows the projection to move from the fifth position to the sixth position.

(9)

A direction of movement of the projection from the fifth position to the sixth position may be substantially perpendicular to a direction of movement of the operation section from the seventh position to the eighth position. The operation section in the seventh position may be in contact with the projection in the fifth position, thereby limiting the movement of the projection from the fifth position to the sixth position, and the operation section in the eighth position may not be in contact with the projection in the fifth position.

(10)

The attachment-side slide portion may be a rail member that extends along the slide direction.

(11)

The attachment-side slide portion may be metal.

(12)

The attachment-side slide portion may include a bottom surface, two side surfaces and two opposing portions. The bottom surface is substantially parallel to the slide direction. The two side surfaces are each substantially parallel to the slide direction and extend from opposite sides of the bottom surface. The two opposing portions extend from the two side surfaces, respectively, and each have a surface opposing the bottom surface. The end portions of the two opposing portions on the first side may be tapered so that a gap therebetween gradually increases toward a distal end.

(13)

The attachment may further include an elastic member. The elastic member is on a bottom surface of the attachment-side slide portion, wherein the elastic member is configured to apply a force, in a direction away from the bottom surface, on the controller-side slide portion while the slide movement is substantially limited by the stopper portion.

(14)

The elastic member may be on the second side of the center of the attachment-side slide portion.

(15)

An area of an operation surface of the attachment-side first operation button may be larger than an area of the controller-side first operation button.

(16)

A tip of the first actuation portion may have a curved surface.

(17)

The first actuation portion may have a cross-shaped cross section along a plane perpendicular to a direction of movement from the first position to the second position.

(18)

Opposite end portions of the second surface in the slide direction may each be a rounded curved surface.

(19)

A light-receiving port may be on a bottom surface of the attachment-side slide portion. A light-exiting port may be on a surface of the attachment different from the bottom surface of the attachment-side slide portion. The attachment may include a lightguide portion configured to guide light incident upon the light-receiving port to the light-exiting port.

(20)

The light-exiting port may be on the second surface.

(21)

The light-exiting port may be on the second surface between the attachment-side first operation button and the attachment-side second operation button.

(22)

Another example attachment described herein is attachable to a game controller including a controller-side slide portion that includes a controller-side operation button. The attachment includes an attachment-side slide portion and an attachment-side operation button. The attachment-side slide portion is on a first surface of the attachment, the attachment-side slide portion having a first side of a center of the attachment-side slide portion and a second side of the center of the attachment-side slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side. The attachment-side first operation button is on a second surface on a reverse side from the first surface. The attachment-side first operation button includes an actuation portion. The actuation portion is configured to move from a first position to a second position, thereby pressing the controller-side operation button, in response to a operation of pressing the attachment-side operation button.

(23)

The attachment may further include a strap anchor to which a strap can be fastened.

(24)

The strap anchor may be on a portion of the attachment which is on the same side of a center of the attachment in the slide direction as the first side.

(25)

Another example attachment described herein is attachable to a game controller including a controller-side slide portion. The attachment includes an attachment-side slide portion, a stopper portion and a strap anchor. The attachment-side slide portion is on a first surface of the attachment, the attachment-side slide portion having a first side of a center of the attachment-side slide portion and a second side of the center of the attachment-side slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side. The stopper portion is on the second side of the center of the attachment-side slide portion and configured to limit a slide movement, in an insertion direction, of the controller-side slide portion which has been inserted from the first side of the attachment-side slide portion. The strap anchor is on a portion of the attachment which is on the same side of the center of the attachment in the slide direction as the first side, wherein a strap can be fastened to the strap anchor.

(26)

The attachment may further include a housing with a hole. The strap anchor may be a shaft inside the housing. The attachment may further include a strap. The strap is fastened to the shaft and extends out of the housing through the hole.

Note that the present specification also discloses an example control system including the attachment described above (e.g., a control system including the attachment described above, and a game controller to which the attachment can be attached).

With the attachment and the control system described above, it is easy to remove the strap from the game controller.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Outline]

Figure 1:
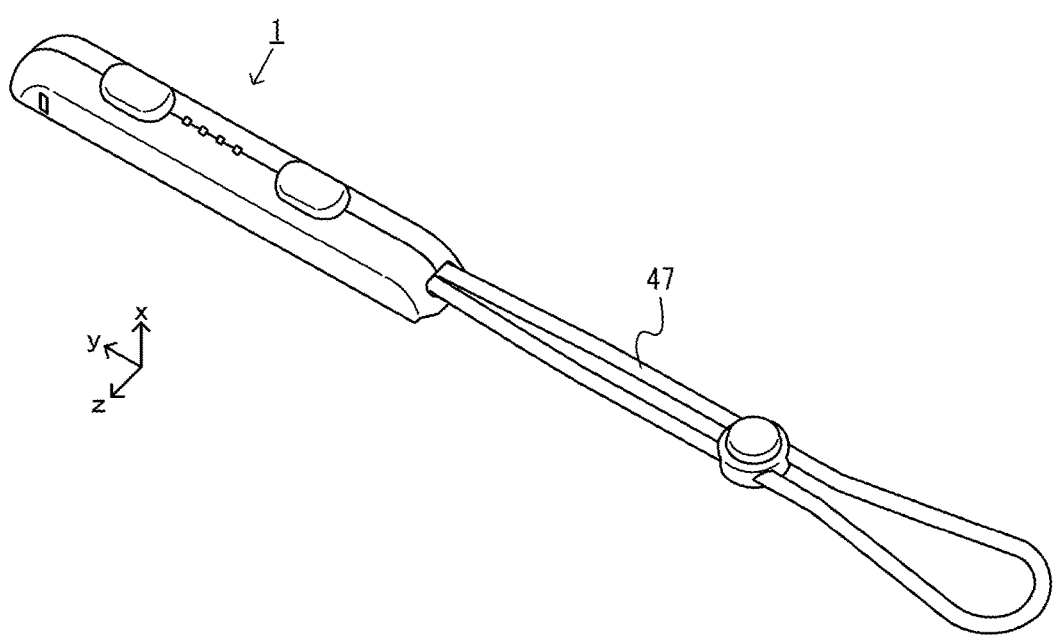
FIG. 1 shows the appearance of a non-limiting example strap attachment.
Figure 2:
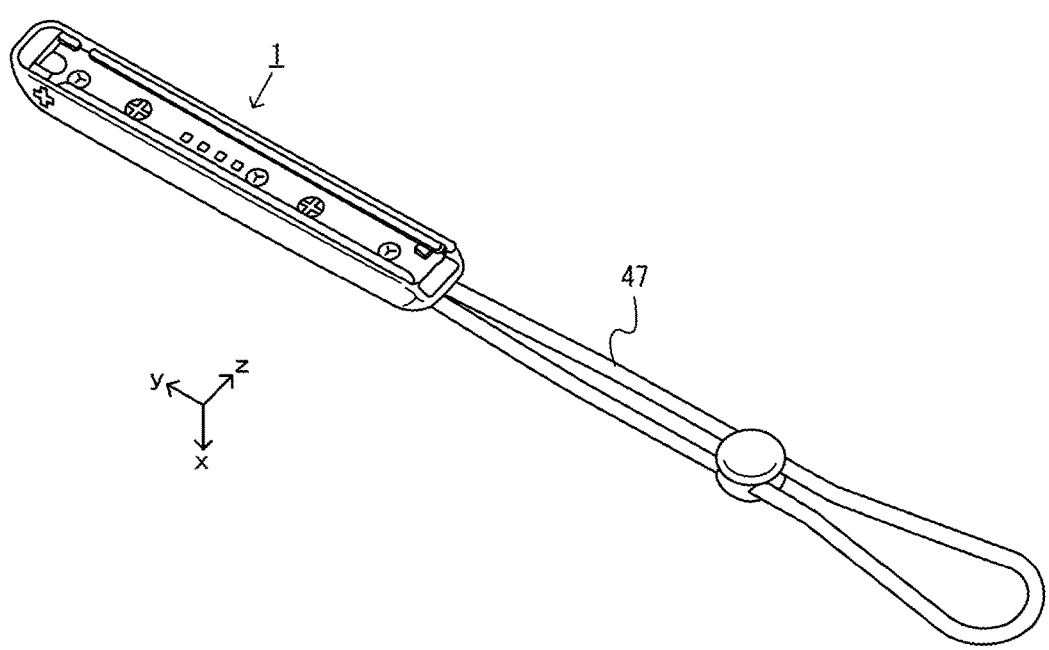
FIG. 2 shows the appearance of a non-limiting example strap attachment.

An attachment according to an example of the present embodiment, and a control system including the same will now be described. FIG. 1 and FIG. 2 each show the appearance of an example strap attachment of the present embodiment. FIG. 1 is a perspective view of the strap attachment as seen from one side (specifically, the x-axis positive direction side). FIG. 2 is a perspective view of the strap attachment as seen from the other side (specifically, the x-axis negative direction side).

A strap attachment 1 shown in FIG. 1 is an example attachment that can be attached to a controller attachment, and is an attachment having a strap 47. A user can fasten the strap 47 to the game controller by attaching the strap attachment 1 to a game controller to be described later. Since the strap attachment 1 can be easily attached/detached to/from a game controller by means of a slide mechanism, the details of which will be described later, the removal of the strap from the game controller can be made easier by the present embodiment. The strap attachment of the present embodiment and a control system including the strap attachment will now be outlined.

(1-1: Game Device with which Strap Attachment can be Used)

Figure 3:
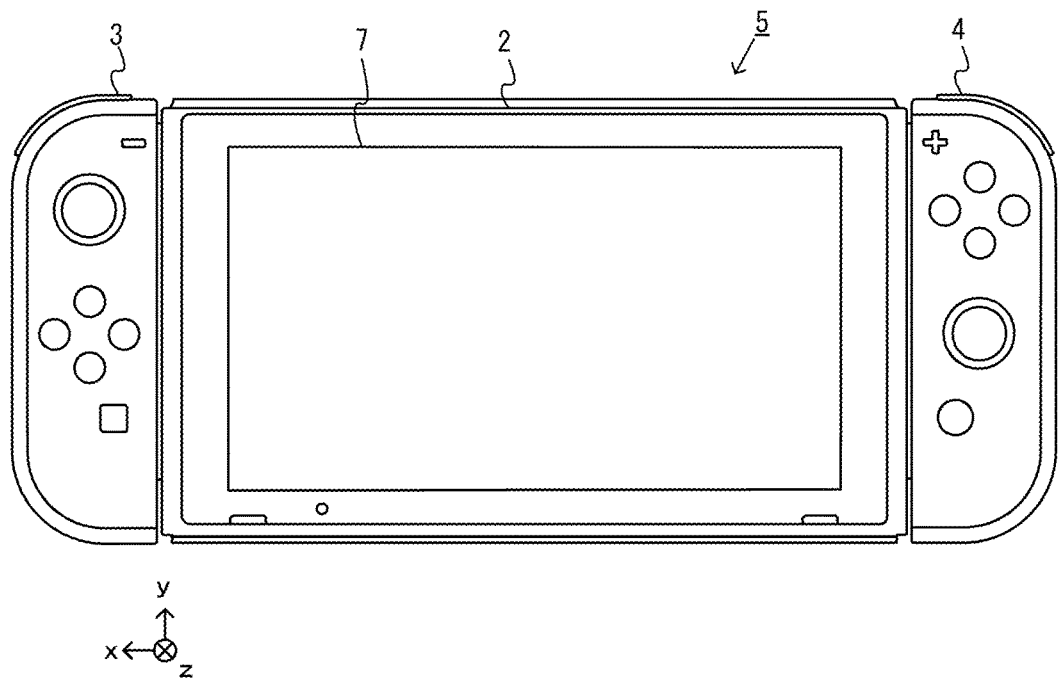
FIG. 3 shows a non-limiting example game device, with which a strap attachment is used.
Figure 4:
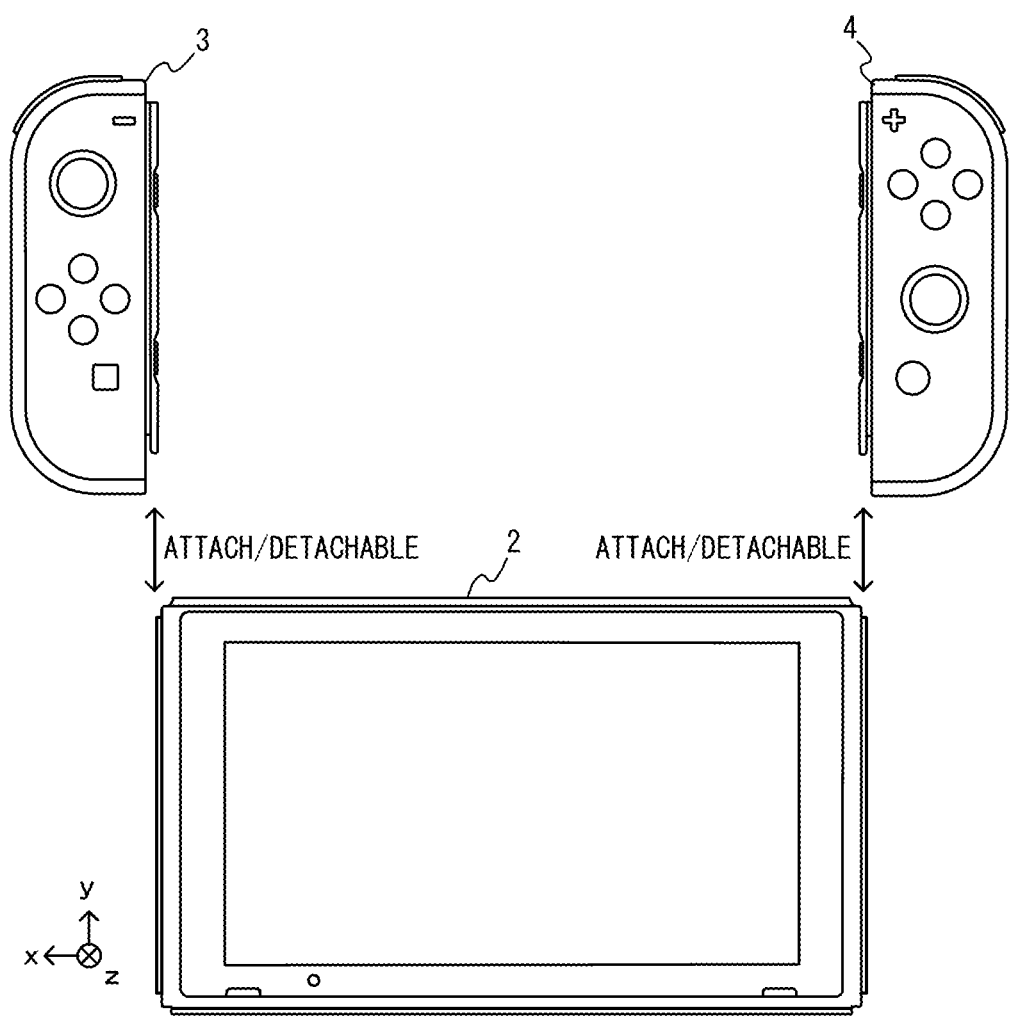
FIG. 4 shows an example state in which controllers are removed from a main unit.

First, referring to FIG. 3 and FIG. 4, an example game device with which the strap attachment 1 can be used (i.e., a game device to which the strap attachment 1 can be attached) will be described. FIG. 3 and FIG. 4 each show an example game device with which the strap attachment 1 can be used. As shown in FIG. 3, a game device 5 includes a main unit 2, a left controller 3 and a right controller 4. The main unit 2, including a display 7, executes various processes of the game device 5. The left controller 3 and the right controller 4 are each an example controller, to which the strap attachment 1 can be attached, and are each an input device (referred to also as a "controller device") allowing a user to make an input. Note that the left controller 3 and the right controller 4 may hereinafter be referred to collectively as a "controller".

FIG. 4 shows an example state in which the controllers 3 and 4 are removed from the main unit 2. As shown in FIG. 3 and FIG. 4, the controllers 3 and 4 can be attached/detached to/from the main unit 2. The left controller 3 can be attached to the left side of the main unit 2 (the x-axis positive direction side shown in FIG. 3). The right controller 4 can be attached to the right side of the main unit 2 (the x-axis negative direction side shown in FIG. 3). In the present embodiment, the strap attachment 1 can be attached to the controller 3 or 4 that has been removed from the main unit 2.

Note that in the present embodiment, the main unit 2 and the controllers 3 and 4 each include a slide portion, and the controllers 3 and 4 are attached (or "connected") to the main unit 2 by means of a slide mechanism, which is formed by these slide portions. The controllers 3 and 4 each include a slider as a slide portion. The main unit 2 includes, as a slide portion, a rail member capable of slidably engaging with the slider. Note that the slider of the controllers 3 and 4 will be described later. Although the rail member of the main unit 2 will not be described in detail, the rail member of the main unit 2 is similar to a rail member of the strap attachment 1 (the details of this rail member will be described later) in that it is capable of slidably engaging with the slider.

When attaching a controller to the main unit 2, a user first inserts the slider of the controller into the rail member of the main unit 2, thereby engaging the slider and the rail member with each other. Then, a user can slide the slider all the way into the rail member, thereby attaching the controller to the main unit 2.

In the present embodiment, as shown in FIG. 4, the controller is attached to the main unit 2 from the upper side (i.e., from the y-axis positive direction side). That is, the controller is attached to the main unit 2 by inserting the slider (specifically, the lower end of the slider) into the upper end portion of the rail member. In other words, it can be said that the main unit 2 is attached to the controller from the lower side. This allows a user to attach/detach the controller to/from the main unit 2 while the main unit 2 is placed on the floor, thereby facilitating the attachment/detachment.

As described above, with the game device 5 of the present embodiment, a user can hold and use the entirety of the game device 5 by attaching the controllers 3 and 4 to the main unit 2 or can hold and use only a controller by removing the controller 3 or 4 from the main unit 2. The strap attachment of the present embodiment is used while it is attached to a controller having been removed from the main unit 2.

(1-2: Outline of Attachment to Controller)

Figure 5:
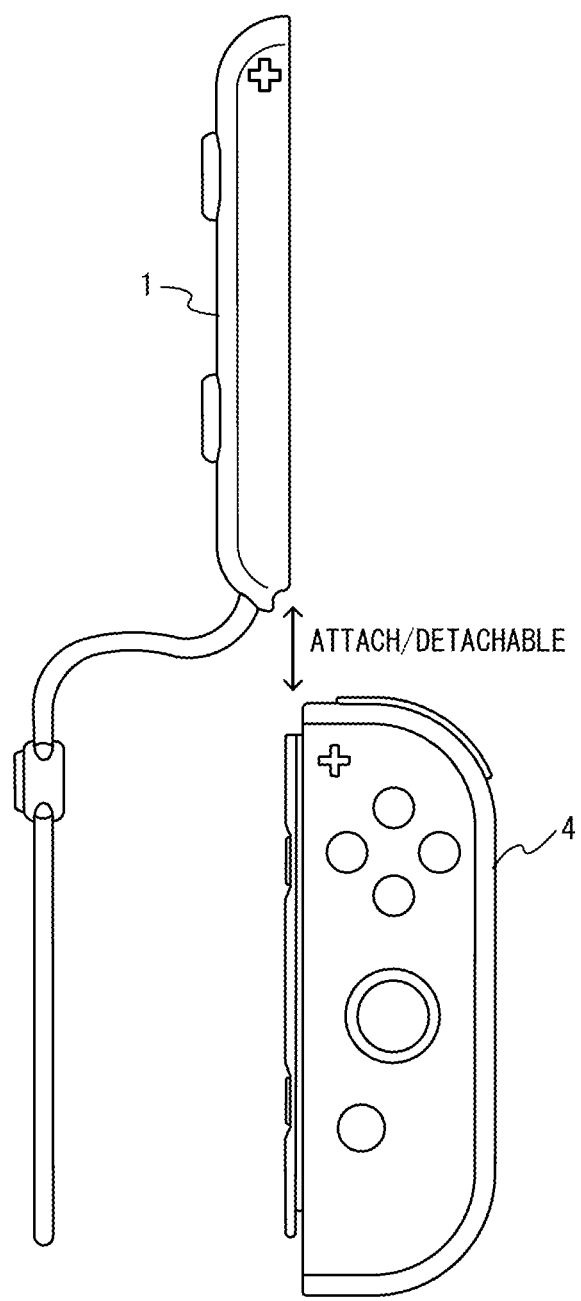
FIG. 5 shows an example of how a strap attachment is attached to a right controller.
Figure 6:
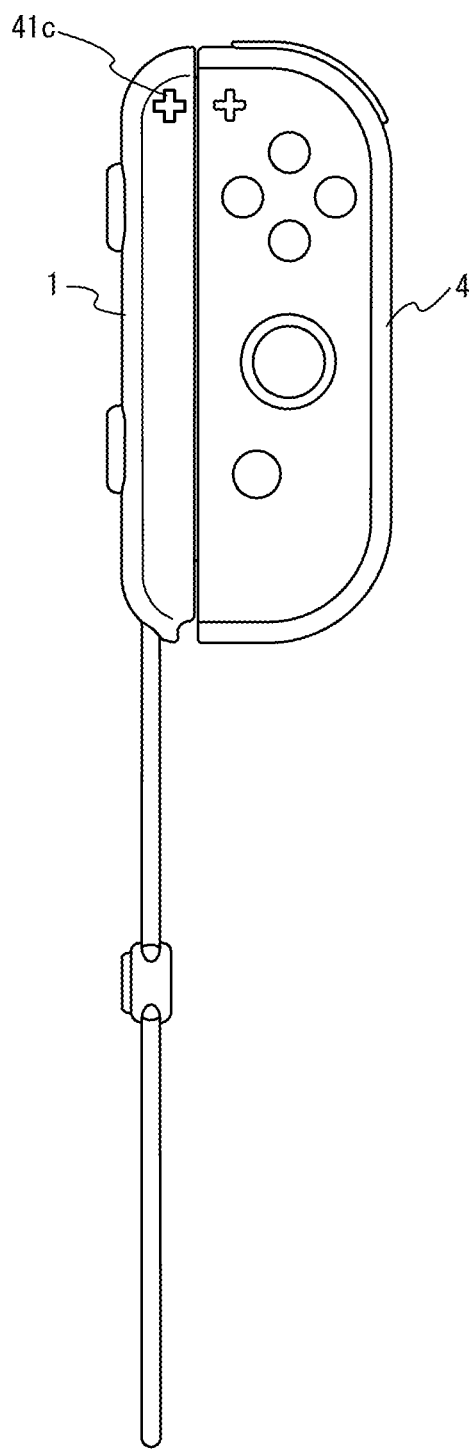
FIG. 6 shows an example state in which a strap attachment is attached to a right controller.
Figure 7:
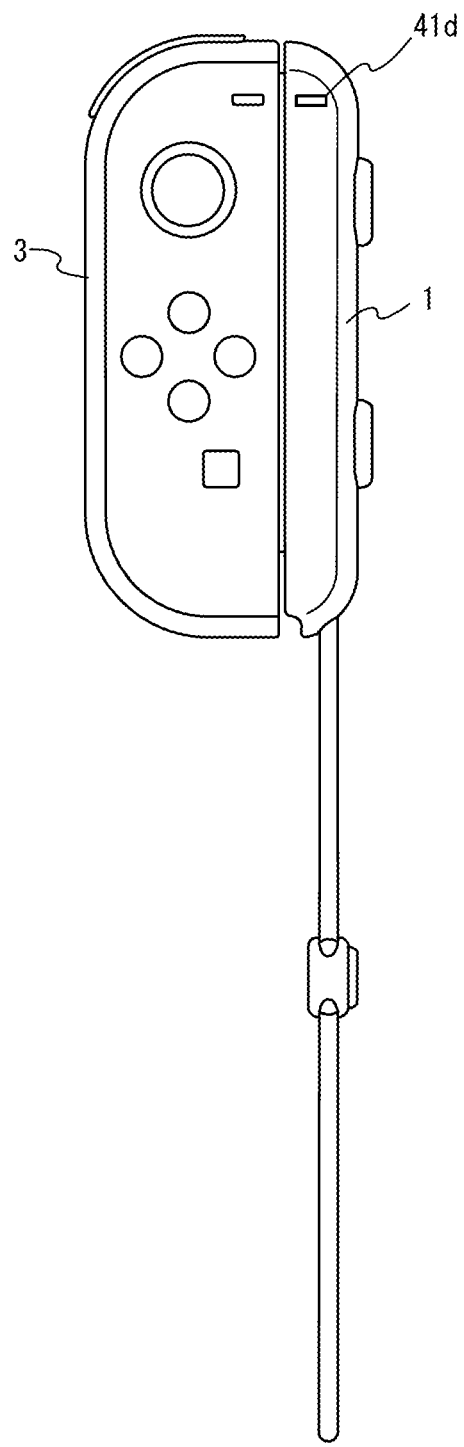
FIG. 7 shows an example state in which a strap attachment is attached to a left controller.

Next, referring to FIG. 5 to FIG. 7, how the strap attachment 1 is attached to the controller will be outlined. FIG. 5 shows an example of how the strap attachment is attached to the right controller. In the present embodiment, the strap attachment 1 includes a rail member (the details of the rail member will be described later) capable of slidably engaging with the slider of the controller. Therefore, the strap attachment 1 can be attached to the controller by inserting the slider of the controller into the rail member of the strap attachment 1 in a similar manner to that when attaching the controller to the main unit 2 (see FIG. 5). Note that in the present embodiment, the strap attachment 1 is attached to the controller by first inserting the lower side of the strap attachment 1 into the upper side of the controller as shown in FIG. 5 (the reason for this will be described later).

FIG. 6 shows an example state in which the strap attachment is attached to the right controller. As shown in FIG. 6, with the strap attachment 1 attached to the right controller 4, the right controller 4 and the strap attachment 1 have an integral appearance (i.e., they appear as if they were an integral unit). Therefore, a user can hold and use the right controller 4 and the strap attachment 1 as an integral unit. Then, a user may hold the right controller 4 and the strap attachment 1 with the strap of the strap attachment 1 put on the wrist. Then, in a situation in which a user swings the right controller 4 and the strap attachment 1, for example, it is possible to control the distance between the user's hand and the right controller 4 and the strap attachment 1 within a predetermined range.

FIG. 7 shows an example state in which the strap attachment is attached to the left controller. As shown in FIG. 6 and FIG. 7, in the present embodiment, the strap attachment 1 can be attached to either the left controller 3 or the right controller 4. Note that the orientation of the strap attachment 1 when the strap attachment 1 is attached to the left controller 3 is opposite to that when the strap attachment 1 is attached to the right controller 4 (see FIG. 6 and FIG. 7). When the strap attachment 1 is attached to the left controller 3, the strap attachment 1 is attached to the left controller 3 from the upper side, as when attaching the strap attachment 1 to the right controller 4.

[2. Configuration of Controller]

Figure 8:
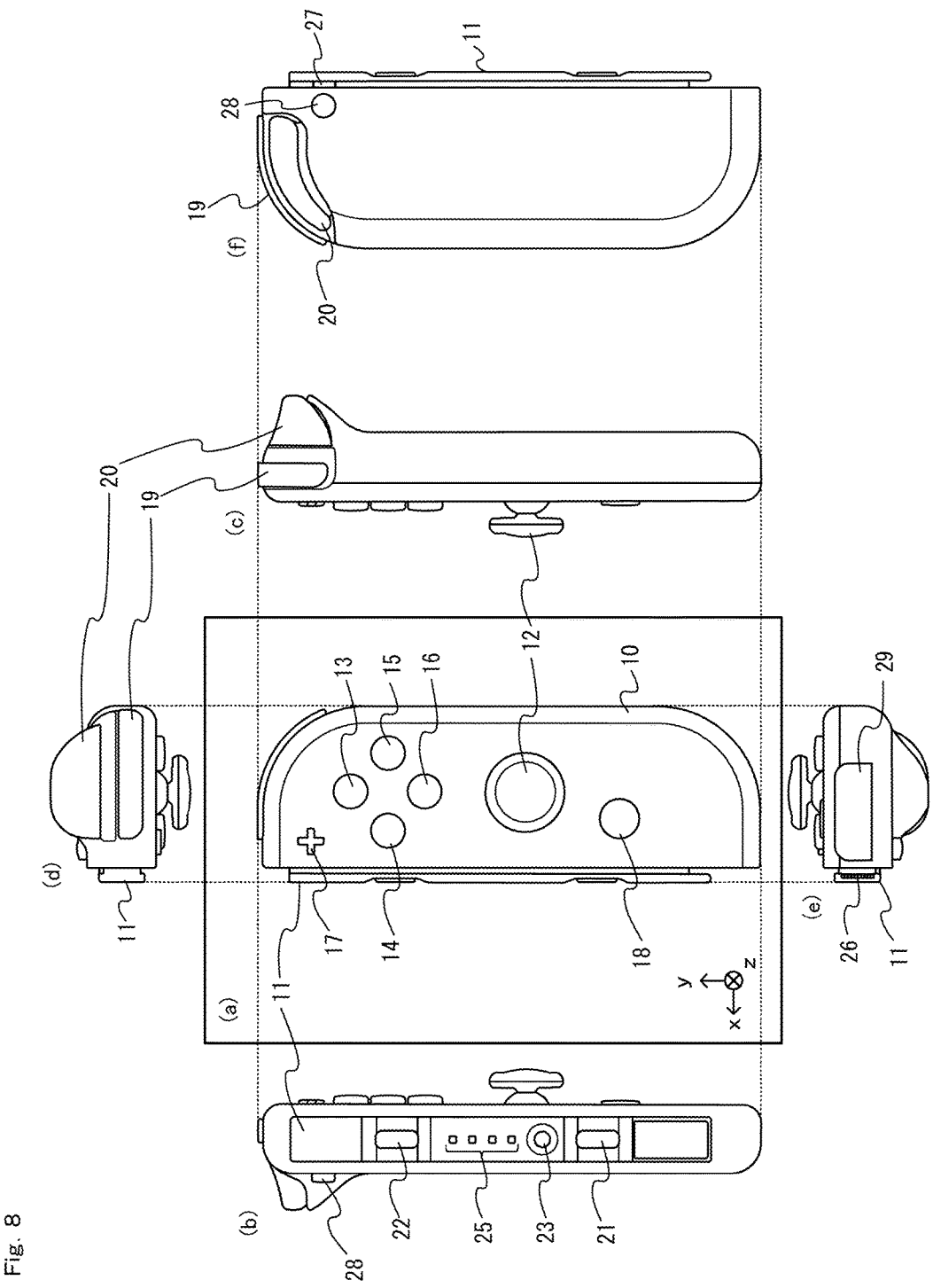
FIG. 8 is a six-sided view showing a non-limiting example right controller.

Next, referring to FIG. 8, an example configuration of the right controller 4 will be described. FIG. 8 is a six-sided view showing an example right controller. Note that the xyz coordinate system of FIG. 8 represents directions in the front view ((a) of FIG. 8).

(2-1: Housing)

As shown in FIG. 8, the right controller 4 includes a housing 10. In the present embodiment, the housing 10 has an oblong shape (elongated in the up-down direction in FIG. 8). The housing 10 generally has a rectangular parallelepiped shape with six sides. As shown in FIG. 8, the right corner portion of the primary surface of the housing 10 (in other words, the front side surface, i.e., the z-axis negative direction side surface shown in FIG. 8) has a more rounded shape than the left corner portion. That is, the connecting portion between the upper side surface and the right side surface of the housing 10 and the connecting portion between the lower side surface and the right side surface of the housing 10 are more rounded (in other words, round-cornered with a greater radius) than the connecting portion between the upper side surface and the left side surface and the connecting portion between the lower side surface and the left side surface. Therefore, when the right controller 4 is connected to the main unit 2 or the strap attachment 1 (see FIG. 3 and FIG. 6), the corner portions of the device including the right controller 4 will be rounded, making it easier for a user to hold the device.

(2-2: Slider)

As shown in FIG. 8, the right controller 4 includes a slider 11. As described above, the slider 11 is a slide portion for connecting the right controller 4 to the main unit 2 or the strap attachment 1. The slider 11 is provided so as to protrude from the left side surface (i.e., the side surface on the x-axis positive direction side) of the right controller 4.

Figure 9:
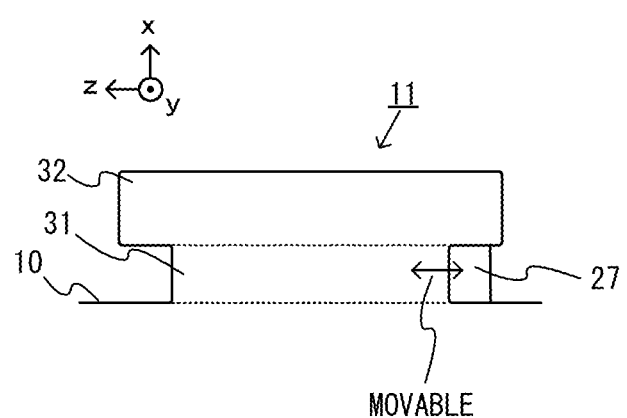
FIG. 9 is an enlarged view showing a non-limiting example slider of a right controller.

FIG. 9 is an enlarged view showing the slider of the right controller. FIG. 9 is an enlarged view showing the slider 11 shown in FIG. 8 as seen from above (i.e., from the y-axis positive direction side). As shown in FIG. 9, the slider 11 is generally shaped so that a cross section thereof taken along a plane perpendicular to the slide direction (i.e., the y-axis direction) is T-shaped.

Specifically, the slider 11 includes a shaft 31 and a top surface portion 32. The shaft 31 is provided so as to protrude from the housing 10. The top surface portion 32 is provided on the side opposite from the housing 10 (i.e., the x-axis positive direction side) of the shaft 31. The width of the top surface portion 32 (i.e., the length with respect to the z-axis direction) is greater than the width of the shaft 31. The end of the top surface portion 32 in the z-axis direction is located so as to protrude past (in other words, located on the outer side of) the end of the shaft 31 in the z-axis direction.

Thus, the cross section of the slider 11 taken along a plane perpendicular to the slide direction has a shape such that the width of the first portion (i.e., the shaft 31) protruding from the side surface of the housing 10 is less than the width of the second portion (i.e., the top surface portion 32) farther away from the side surface of the housing 10 than the first portion. With such a shape, the slider 11 in engagement with the rail member is secured so as not to come off the rail member in the direction perpendicular to the slide direction (see FIG. 13), the details of which will be described later.

As shown in FIG. 8 and FIG. 9, in the present embodiment, the right controller 4 includes a projection 27. As shown in FIG. 9, the projection 27 is provided so as to protrude from the side surface of the shaft 31 of the slider 11. Specifically, a hole is provided on the side surface of the shaft 31, and the projection 27 is provided so as to protrude through the hole. The projection 27 can move between the protruding state in which the projection 27 is protruding from the side surface of the shaft 31 and a state in which the projection 27 has moved from the position in the protruding state toward the inside of the side surface (referred to as the "retracted state"; note however that the projection 27 does not need to be retracted completely inside the shaft 31). In the present embodiment, the projection 27 is biased toward the protruding state by means of an elastic member (referred to also as a "biasing member") such as a spring, for example.

In a state in which the right controller 4 is attached to the main unit 2 (referred to as the "attached state"), the projection 27 is used for locking the slide movement of the right controller 4 with respect to the main unit 2. The rail member of the main unit 2 includes a cut-out portion at a position corresponding to the projection 27 in the attached state. Although not shown in the figure, the cut-out portion of the rail member of the main unit 2 is formed at a position similar to that of a cut-out portion provided in the rail member of the strap attachment 1 (the details of which will be described later) (see FIG. 14). Note that in the present embodiment, the projection 27 is provided along the upper half of the slider 11 (i.e., on the y-axis positive direction side), and the cut-out portion is provided along the upper half of the rail member. Thus, in the attached state, the projection 27 in the protruding state engages with the cut-out portion of the rail member. Thus, the projection 27 is capable of generally preventing (in other words, locking) the slide movement of the right controller 4 against the main unit 2.

As shown in FIG. 8, the right controller 4 includes a release button 28. Although not shown in the figure, the release button 28 is configured so that the release button 28 can move in conjunction with the projection 27. Specifically, the projection 27 is in the protruding state when the release button 28 is not pressed, and the projection 27 is brought into the retracted state in response to the release button 28 being pressed. In the attached state, when the projection 27 is in the retracted state, the projection 27 does not engage (or not substantially engage) with the cut-out portion of the rail member. Therefore, in the retracted state, the engagement (in other words, the lock) by the projection 27 is released.

Thus, a user can press the release button 28 to bring the projection 27 into the retracted state, releasing the lock by the projection 27. Therefore, a user can easily remove the right controller 4 from the main unit 2 by sliding the right controller 4 while the release button 28 is pressed to release the lock.

(2-3: Input Section)

The right controller 4 includes operation sections (or "input sections") allowing a user to perform input operations. In the present embodiment, the right controller 4 includes an analog stick 12 and buttons 13 to 23 as operation sections.

The analog stick 12 and the buttons 13 to 18 are provided on the primary surface of the housing 10. The analog stick 12 is an example of a direction input section, with which it is possible to make directional inputs. When the right controller 4 is used detached from the main unit 2, the operation sections provided on the primary surface of the housing 10 are operated by the thumbs of a user holding the right controller 4.

A first R button 19 and a ZR button 20 are provided on the upper side surface (i.e., the side surface on the y-axis positive direction side) of the housing 10. The first R button 19 is provided over a corner portion between the right side surface and the upper side surface of the housing 10. The ZR button 20 is provided to extend over a corner portion between the right side surface and the upper side surface of the housing 10 (strictly speaking, between the right side surface and the upper side surface as seen from the front side of the housing 10) while extending into the reverse surface of the housing 10. When the right controller 4 is used detached from the main unit 2, and when a user holds the right controller 4 in one hand, for example, the buttons 19 and 20 provided on the upper side surface of the housing 10 are operated using the index finger and/or the middle finger of the user, for example.

A second L button 21 and a second R button 22 are provided on the top surface of the slider 11. Herein, the top surface of the slider is a surface that is facing substantially the same direction as the surface of the housing 10 on which the slider is provided. In other words, the top surface is a surface that opposes the bottom surface of the rail member of the main unit 2 when the controller is attached to the main unit 2. When a user holds the right controller 4 using both hands, for example, the buttons 21 and 22 provided on the top surface of the slider 11 are operated using the index finger and/or the middle finger of the user, for example.

The buttons 13 to 22 are used to give instructions in accordance with various programs executed on the main unit 2 (e.g., the OS program and application programs).

A pairing button 23 is provided on the top surface of the slider 11. In the present embodiment, the pairing button 23 is used to give instructions regarding wireless communication between the right controller 4 and the main unit 2. Processes regarding wireless communication include, for example, a setting (referred to also as pairing) process regarding wireless communication between the right controller 4 and the main unit 2, and a process (also referred to as a resetting process) of disconnecting and then reconnecting wireless communication.

Note that in the present embodiment, the buttons 21 to 23 provided on the top surface of the slider 11 are provided so as not to protrude past the top surface. That is, the operation surfaces of the buttons 21 to 23 are arranged flush with the top surface of the slider 11 or arranged at a position sunken from the top surface. This allows the slider 11 to slide smoothly against the rail member when the slider 11 is engaged with the rail member of the main unit 2 or the strap attachment 1.

Although not shown in the figures, the right controller 4 includes an acceleration sensor and an angular velocity sensor as example input sections in the present embodiment. The acceleration sensor detects the magnitude of the linear acceleration along directions of predetermined three axes (e.g., the xyz axes shown in FIG. 3). Note that the acceleration sensor may detect acceleration in one axis direction or two axis directions. The angular velocity sensor detects the angular velocity about predetermined three axes (e.g., the xyz axes shown in FIG. 3). Note that the angular velocity sensor may detect the angular velocity about one axis or two axes.

Based on the detection results of the acceleration sensor and the angular velocity sensor, the main unit 2 can calculate information regarding the movement and/or the attitude of the right controller 4. That is, in the present embodiment, a user is allowed to perform an operation of moving the controller itself. Note that in other embodiments, another type of sensor may be used as a sensor (e.g., an inertial sensor) for calculating the movement, the attitude and/or the position of the controller.

(2-4: Other Elements)

The right controller 4 includes an indicator LED 25. The indicator LED 25 is an indicator section for indicating predetermined information to the user. In the present embodiment, the right controller 4 includes four LEDs as the indicator LED 25. For example, the predetermined information may be the number assigned to the right controller 4 by the main unit 2 or may be information regarding the remaining battery level of the right controller 4.

As shown in FIG. 8, in the present embodiment, the indicator LED 25 is provided on the slider 11 (specifically, on the top surface of the slider 11). Thus, the indicator LED 25 is arranged at such a position that the indicator LED 25 cannot be seen with the right controller 4 attached to the main unit 2, and the indicator LED 25 is used primarily when the right controller 4 is detached from the main unit 2. In the present embodiment, the indicator LED 25 is provided between the second L button 21 and the second R button 22. Then, when a user holds the right controller 4 using both hands, for example, the indicator LED 25 is arranged at such a position that it is easy to see the indicator LED 25 (in other words, such a position that it is unlikely blocked by the hands of the user) for the user who operates the second L button 21 using the index finger of the left hand and the second R button 22 using the index finger of the right hand.

The right controller 4 includes a terminal 26 via which the right controller 4 is electrically connected to the main unit 2. In the present embodiment, the terminal 26 is provided in a lower end portion (i.e., an end portion on the y-axis negative direction side) of the slider 11. The present embodiment is configured so that the terminal 26 of the right controller 4 and the terminal of the main unit 2 are in contact with each other in the attached state, though this will not be discussed in detail. This enables wired communication via the terminal between the right controller 4 and the main unit 2 in the attached state.

Note that in the present embodiment, the right controller 4 has a function of communicating with the main unit 2 in wireless communication. While there is no particular limitation on the communication scheme between the main unit 2 and the controllers, the main unit 2 and the controllers 3 and 4 can communicate with each other in accordance with the Bluetooth (registered trademark) standard in the present embodiment.

Thus, in the present embodiment, the controller is capable of communicating with the main unit 2 either attached to the main unit 2 or removed from the main unit 2. For example, the controller transmits, to the main unit 2, data representing inputs on the input sections.

As shown in FIG. 8, a window portion 29 is provided in the lower side surface of the housing 10. In the present embodiment, the right controller 4 includes an infrared image-capturing section (not shown) to detect the hand movement and/or the gesture of the user by means of the infrared image-capturing section. The window portion 29 is provided so as to allow the camera of the infrared image-capturing section arranged inside the housing 10 to capture an image of around the right controller 4. The window portion 29 is provided for protecting the lens of the camera of the infrared image-capturing section, and is made of a material (e.g., a transparent material) that allows light of a wavelength to be detected by the camera to pass therethrough.

(2-5: Configuration of Left Controller 3)

The left controller 3 is configured differently from the right controller 4 with respect to the shape of the housing (the housing of the left controller 3 has a shape that is generally in left-right symmetry with the housing 10 of the right controller 4) and the arrangement of the operation sections (the analog stick and the buttons) (see FIG. 3 and FIG. 4).

On the other hand, the left controller 3 has a similar configuration to that of the right controller 4 with respect to the slide portion (specifically, the slider). Note that the right controller 4 includes the slider provided on the left side surface of the housing 10, whereas the left controller 3 includes the slider provided on the right side surface of the housing (see FIG. 3 and FIG. 7). Note however that in the present embodiment, the right controller 4 is the same as the left controller 3 with respect to the slider and the members to be provided on the slider (specifically, the buttons 21 to 24 and the indicator LED 25).

The left controller 3 includes an acceleration sensor and an angular velocity sensor, as does the right controller 4, and a user is allowed to perform an operation of moving the left controller 3 itself.

In the present embodiment, the second L button and the second R button are provided on the top surface of the slider of the controllers 3 and 4. The second L button and the second R button are arranged at the same position on the left controller 3 and on the right controller 4 with respect to the up-down direction (i.e., the y-axis direction). Then, when the strap attachment 1 is attached to the controller 3 or 4, it is possible to operate the second L button and the second R button by pressing buttons on the strap attachment 1, the details of which will be described later.

In the present embodiment, indicator LEDs (four indicator LEDs in the present embodiment) are provided on the top surface of the slider of each of the controllers 3 and 4. The indicator LEDs are arranged at the same position on the left controller 3 and on the right controller 4 with respect to the up-down direction (i.e., the y-axis direction). Then, when the strap attachment 1 is attached to the controller 3 or 4, it is possible to allow light from an indicator LED to be output from a light-exiting port of the strap attachment 1, the details of which will be described later.

Note that for the controllers 3 and 4, there is no particular limitation on the shape, the number and the arrangement of the various elements (specifically, the slider, the stick, the buttons, the LEDs, etc.) provided on the housing. For example, in other embodiments, the controllers 3 and 4 may include a direction input section of a different type from an analog stick. The slider may be arranged at a position that corresponds to the position of the rail member provided on the main unit 2, and may be, for example, arranged on the primary surface or the reverse surface of the housing. In other embodiments, one or more of the various elements described above may be absent on the controllers 3 and 4.

[3. Configuration of Strap Attachment]

Figure 10:
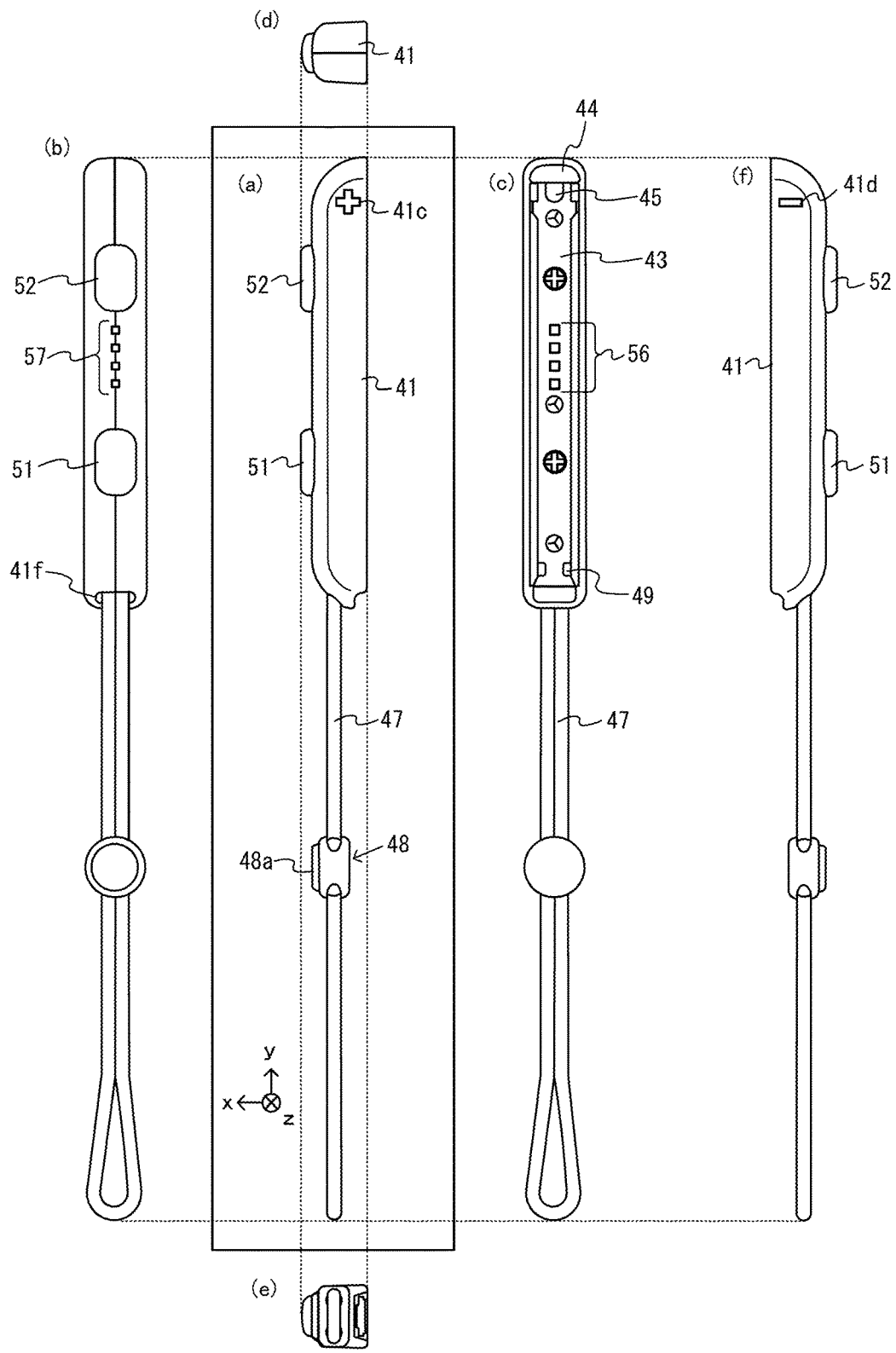
FIG. 10 is a six-sided view showing a non-limiting example strap attachment.
Figure 11:
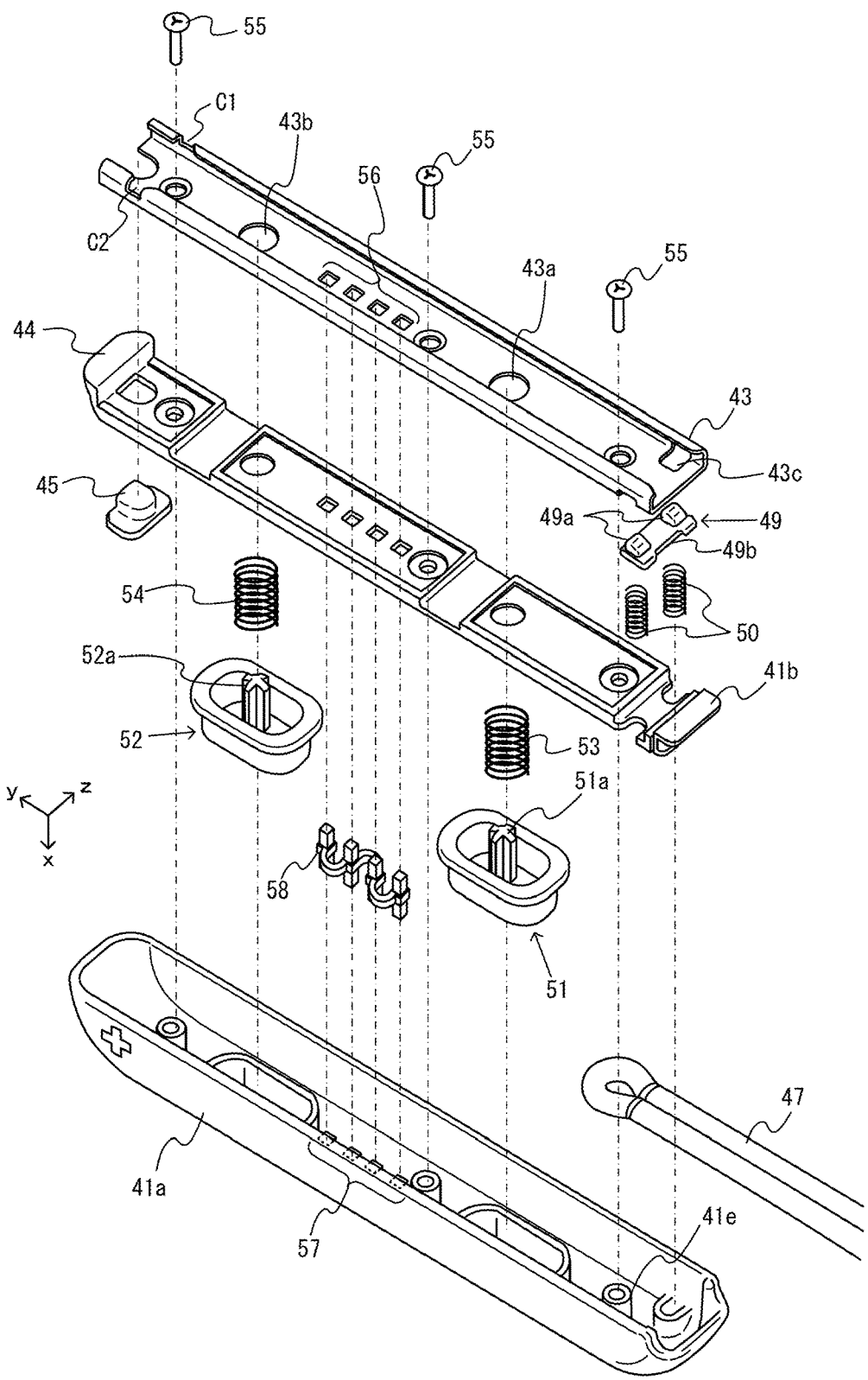
FIG. 11 is an exploded perspective view showing an example of the strap attachment shown in FIG. 10.

Next, referring to FIG. 10 to FIG. 17, an example configuration of the strap attachment 1 will be described. FIG. 10 is a six-sided view showing an example strap attachment. FIG. 11 is an exploded perspective view showing the example strap attachment shown in FIG. 10. Note that the xyz coordinate system of FIG. 10 represents directions in the front view ((a) of FIG. 10).

(3-1: Elements Regarding Housing)

As shown in FIG. 10, the strap attachment 1 includes a housing 41. While there is no particular limitation on the shape of the housing 41, the housing 41 has an oblong shape (elongated in the up-down direction in FIG. 10) in the present embodiment. The housing 41 includes an engaging surface (in other words, the right side surface, i.e., the x-axis negative direction side surface) on which a rail member 43 to be described later is provided, and a button provision surface (in other words, the left side surface, i.e., the x-axis positive direction side surface) on which the buttons 51 and 52 to be described later are provided. As shown in FIG. 11, in the present embodiment, the housing 41 includes a first member 41a and a second member 41b. The second member 41b is a member that forms the engaging surface, and the first member 41a is a member that forms surfaces other than the engaging surface (including the button provision surface). The first member 41a and the second member 41b are coupled together with screws 55 (herein, three screws 55), thereby forming the housing 41. Note that it can be said that the housing also includes the rail member 43, in addition to the first member 41a and the second member 41b. That is, it can be said that the rail member 43 is also a part of the housing.

As shown in FIG. 10, in the present embodiment, the opposite end portions of the button provision surface of the housing 41 in the slide direction (i.e., the opposite ends in the y-axis direction) are each a rounded curved surface. Then, the device including the strap attachment 1 and the controller to which the strap attachment 1 is attached (hereinafter referred to as the "strap-attached controller device") can have rounded corner portions (see FIG. 6 and FIG. 7). Thus, it is possible to provide a device that is easy to hold for a user.

In the present embodiment, the two surfaces (i.e., the front surface and the rear surface; in other words, the z-axis negative direction side surface and the z-axis positive direction side surface) provided between the engaging surface and the button provision surface are marked differently from each other. Specifically, as shown in FIG. 10, The front surface of the housing 41 is marked with a plus mark 41c representing "+", and the rear surface of the housing 41 is marked with a minus mark 41d representing "−". These marks 41c and 41d are provided so that a user can recognize the orientation of the strap attachment 1 to be attached to the two different controllers 3 and 4. That is, when the strap attachment 1 is attached to the right controller 4, which has the "+"-shaped button 17 on the primary surface, the plus mark 41c prompts a user to attach the strap attachment 1 so that the front surface of the housing 41 marked with the plus mark 41c is facing the same direction as the primary surface of the right controller 4 (see FIG. 6). When the strap attachment 1 is attached to the left controller 3, which has the "−"-shaped button on the primary surface, the minus mark 41d prompts a user to attach the strap attachment 1 so that the rear surface of the housing 41 marked with the minus mark 41d is facing the same direction as the primary surface of the left controller 3 (see FIG. 7). Thus, when attaching the strap attachment 1 to the controller 3 or 4, a user can easily recognize the orientation of the strap attachment 1.

Note that in other embodiments, other methods of distinction may be used in addition to (or instead of) the marks 41c and 41d. For example, in other embodiments, the front surface side and the rear surface side of the housing 41 may differ from each other in appearance (e.g., color, pattern or texture (specifically, the presence/absence of a luster)). The appearance of the primary surface of the left controller 3 may be the same as (or similar to) that of the front surface of the housing 41, or the appearance of the primary surface of the right controller 4 may be the same as (or similar to) that of the rear surface of the housing 41.

(3-2: Elements Regarding Rail Member)

As shown in FIG. 10, the strap attachment 1 includes the rail member 43. The rail member 43 is an example slide portion capable of slidably engaging with the slider of the controller. The rail member 43 is provided on the engaging surface of the housing 41. In the present embodiment, as shown in FIG. 11, the rail member 43 is attached to the housing 41, together with the first member 41a and the second member 41b of the housing 41, by means of the three screws 55. Note that in other embodiments, the rail member 43 may be provided as an integral part of the housing 41. That is, a part of the housing 41 may serve as the rail member.

Figure 12:
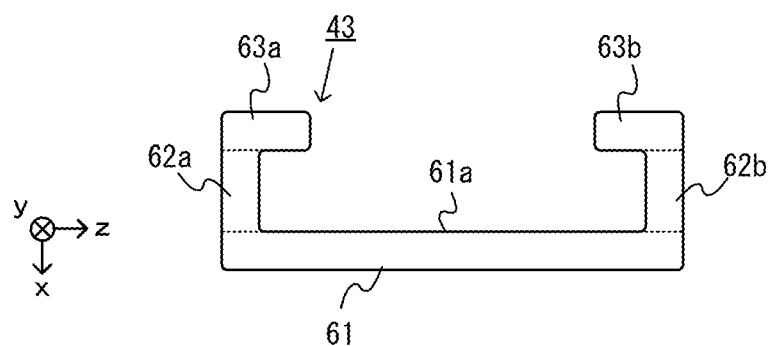
FIG. 12 schematically shows an example rail member as seen from the slide direction.

FIG. 12 schematically shows an example rail member as seen from the slide direction. Note that "to schematically show" as used herein means to show an element of interest (e.g., the rail member in FIG. 12) in such a manner that its size, shape and positional relationship with other elements may be different from other figures for the sake of simplicity.

As shown in FIG. 12, the rail member 43 includes a bottom surface portion 61, side surface portions 62a and 62b and opposing portions 63a and 63b. Note that the side surface portions 62a and 62b may hereinafter be referred to collectively as "side surface portion 62". The opposing portions 63a and 63b may be referred to collectively as "opposing portion 63". In the present embodiment, the portions 61 to 63 are generally plate-shaped members.

As shown in FIG. 12, the bottom surface portion 61 is placed on the engaging surface of the housing 41 so as to be substantially parallel to the engaging surface. Note that "substantially (in a certain state)" as used herein means to include cases in which that state is achieved in a strict sense and also cases in which that state is generally achieved. For example, "substantially parallel" means that they may be parallel to each other in a strict sense, and they may not be parallel to each other in a strict sense but may be generally parallel to each other. For example, "substantially parallel" includes at least deviations from ideal or nominal values that are within manufacturing, operational and/or inspection tolerances.

The bottom surface portion 61 includes a bottom surface 61a of the rail member 43. As shown in FIG. 12, the side surface portion 62 includes side surfaces substantially perpendicular to the bottom surface 61a. The side surface portion 62 extends, substantially perpendicular to the bottom surface portion 61, from opposite ends of the bottom surface portion 61 with respect to the width direction (i.e., the z-axis direction). Specifically, a side surface portion 62a extends from one end (i.e., on the z-axis negative direction side) of the bottom surface portion 61, and a side surface portion 62b extends from the other end (i.e., on the z-axis positive direction side) of the bottom surface portion 61. As shown in FIG. 12, the bottom surface portion 61 and the side surface portion 62 together form a groove.

As shown in FIG. 12, the opposing portion 63 is provided to extend from each of the two side surfaces of the side surface portion 62, and includes a surface that opposes the bottom surface 61a. The opposing portion 63 extends in a direction substantially parallel to the bottom surface 61a from an end (i.e., an end on the x-axis negative direction side) of the side surface portion 62 that is opposite to the end at which the bottom surface portion 61 is connected to the side surface portion 62. Specifically, the opposing portion 63a extends from an end portion of the side surface portion 62a on the x-axis negative direction side, and the opposing portion 63b extends from an end portion of the side surface portion 62b on the x-axis negative direction side. The opposing portions 63a and 63b are provided so as to protrude from the side surface portion 62 toward the inside of the rail member 43 (in other words, so as to protrude toward each other). The opposing portion 63a and the opposing portion 63b are spaced apart from each other so that the slider of the controller can be inserted into the groove formed by the bottom surface portion 61 and the side surface portion 62 (FIG. 12).

Figure 13:
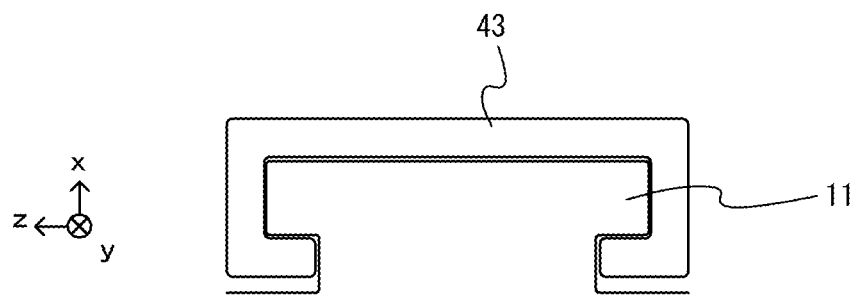
FIG. 13 schematically shows an example state in which a slider of a controller is in engagement with a rail member of a strap attachment.

FIG. 13 schematically shows an example state in which the slider of the controller is in engagement with the rail member of the strap attachment. FIG. 13 schematically shows a state in which the slider 11 of the right controller 4 is in engagement with the rail member 43 of the strap attachment 1. When the strap attachment 1 is attached to the right controller 4, the slider 11 of the right controller 4 is inserted into the groove of the rail member 43, thereby achieving a state in which the rail member 43 and the slider 11 are engaged with each other as shown in FIG. 13. In this state, the slider 11 in engagement with the rail member 43 is allowed to slide in the slide direction (i.e., the y-axis direction) while being secured by the opposing portion 63 so as not to come off in the direction (i.e., the x-axis direction) perpendicular to the slide direction.

As shown in FIG. 11, the lower end (i.e., the end on the y-axis negative direction side) of the rail member 43 is open so that the slider of the controller can be inserted. On the other hand, a stopper portion 44 is provided on the upper end side (i.e., the y-axis positive direction side) of the rail member 43. The stopper portion 44 is provided for the purpose of limiting the movement of the slider, which is inserted from the lower end of the rail member 43, in the insertion direction (i.e., the y-axis positive direction). That is, the slider, which is inserted from the lower end of the rail member 43, comes into contact with the stopper portion 44, to stop sliding in the insertion direction. The "state in which the strap attachment 1 is attached to the controller (referred to as the attached state)" as used herein is the state in which the slide movement of the slider is substantially limited by the stopper portion 44. Note that in addition to the state in which the slider is in contact with the stopper portion 44, the attached state also includes a state in which the slider and the stopper portion 44 are not in contact with each other in a strict sense but the slider cannot substantially move in the insertion direction (because there is substantially no gap between the slider and the stopper portion 44).

In the present embodiment, the stopper portion 44 is provided as an integral part of the second member 41b of the housing 41. Note that in other embodiments, the stopper portion 44 may be provided as an integral part of the rail member 43, or the stopper portion 44 may be separate from the housing 41 and the rail member 43.

There is no particular limitation on the arrangement of the stopper portion 44. The stopper portion 44 is provided near one end portion of the rail member 43 in the slide direction, and it may be provided on the outside (the upper side in the present embodiment) of the end portion of the rail member 43, or may be provided on the inside of the rail member 43 (e.g., in the upper end portion of the rail member 43). Note that in the present embodiment, since the stopper portion 44 is provided near the upper end portion of the rail member 43, the strap attachment 1 is attached to the controller by attaching the lower side thereof to (the upper side of) the controller (see FIG. 5).

As described above, in the present embodiment, the strap attachment 1 includes the stopper portion 44 provided near the upper end portion of the rail member 43 configured to limit the slide movement, in the insertion direction, of the slider which is inserted from the lower side of the rail member 43. Thus, it is possible to limit the movement of the slider inserted into the rail member 43.

As described above, in the present embodiment, the strap attachment 1 includes, as the slide portion, the rail member 43 that extends along the slide direction. Then, when the slider of the controller is inserted into the rail member 43 of the strap attachment 1, it is easy to slide the strap attachment 1 (which can be said to be the slide movement of the controller).

Note that in other embodiments, the slide portion of the strap attachment 1 does not need to be a single member extending in the slide direction, but may include a plurality of members arranged along the slide direction. For example, the strap attachment 1 may include, instead of the rail member 43, a plurality of members having a similar cross-sectional shape (specifically, a cross-sectional shape taken along a plane perpendicular to the slide direction) to that of the rail member 43. In this case, the plurality of members are arranged along the slide direction. Also with such a plurality of members, the strap attachment 1 can slidably engage with the slider of the controller.

In the present embodiment, the rail member 43 is formed from metal. Then, it is possible to improve the mechanical strength of the rail member. It is also possible to improve the mechanical strength of the housing 41 itself, on which the rail member is provided. Note that in the present embodiment, the housing 41 is formed from a resin. In other embodiments, there is no particular limitation on the material of the rail member 43, and the rail member 43 may be formed from a resin (which may be a resin harder than that of the housing 41).

Figure 14:
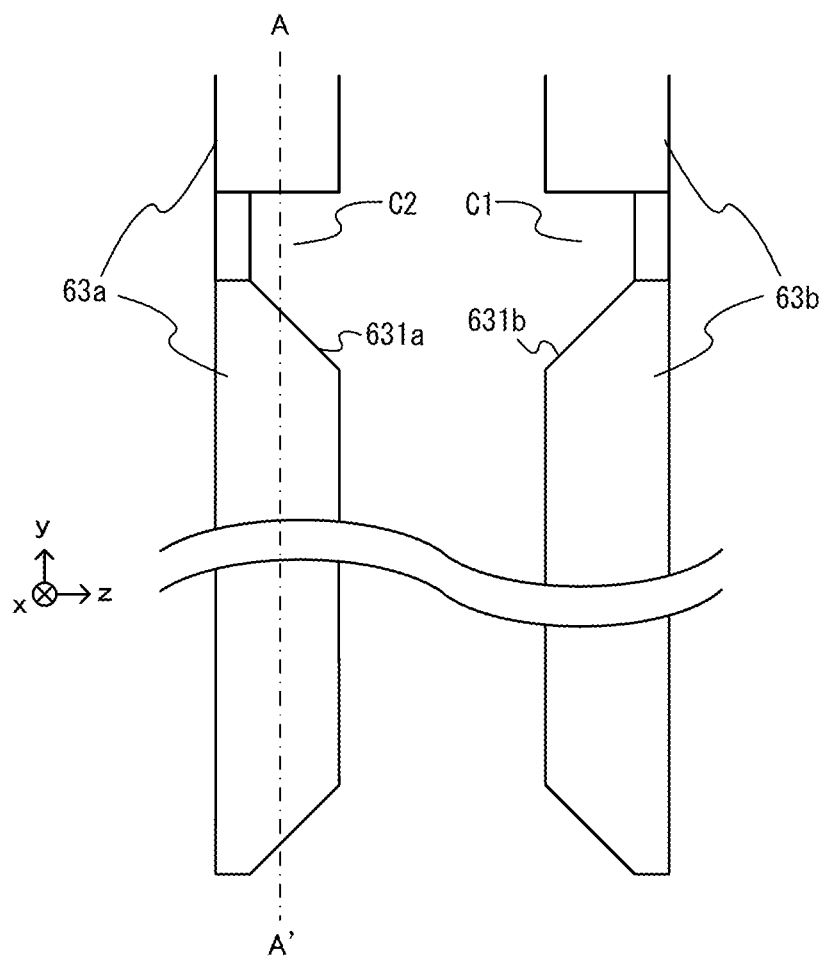
FIG. 14 schematically shows an example opposing portion of a rail member.

FIG. 14 schematically shows an example opposing portion of the rail member. Note that FIG. 14 shows, on an enlarged scale, an upper end portion (i.e., an end portion on the y-axis positive direction side) and a lower end portion (i.e., an end portion on the y-axis negative direction side) of the opposing portion 63.

As shown in FIG. 14, in the present embodiment, the cut-out portions C1 and C2 are provided in a portion of the opposing portion 63. The cut-out portions C1 and C2 are provided so that the projection of the controller is not in contact with the opposing portion 63 (in other words, so as to allow the projection to be in the protruding state) in the attached state in which the strap attachment 1 is attached to the controller, the details of which will be described later. That is, the cut-out portions C1 and C2 are at positions corresponding to the projection of the controller in the attached state. Specifically, the cut-out portions C1 and C2 are in an upper end portion of the rail member 43 (see FIG. 14). Note that in the attached state, the projection of the controller engages with the cut-out portion of the opposing portion 63 (strictly speaking, the opposing portion 63 around the cut-out portion).

As shown in FIG. 14, the opposing portion 63 includes contact surfaces 631a and 631b in an area where the cut-out portions C1 and C2 are formed. In the attached state, a surface of the projection of the controller that is facing the lower side (i.e., the y-axis negative direction side) comes into contact with the contact surface. That is, the contact surface 631a is a surface with which the projection of the left controller 3 comes into contact when the left controller 3 and the strap attachment 1 are attached together. The contact surface 631b is a surface with which the projection 27 of the right controller 4 comes into contact when the right controller 4 and the strap attachment 1 are attached together.

In the present embodiment, the contact surfaces 631a and 631b are formed so that the gap between the two opposing portions 63a and 63b gradually narrows in the downward direction (i.e., toward the y-axis negative direction side) (see FIG. 14). The contact surfaces 631a and 631b are each part of the boundary of the gap between the two opposing portions 63a and 63b that gradually narrows toward the lower side. Then, when detaching the strap attachment 1 from the controller, the projection of the controller is unlikely interfered by the opposing portion 63. This allows a user to smoothly detach the strap attachment 1 from the controller.

As shown in FIG. 14, in the present embodiment, lower end portions of the two opposing portions 63a and 63b are tapered so that the gap therebetween gradually increases toward the distal end (in other words, in the downward direction). Then, when the slider of the controller is inserted into the lower end of the rail member 43, the projection of the controller is unlikely interfered by the opposing portion 63. This allows a user to smoothly attach the strap attachment 1 to the controller.

(Projection)

As shown in FIG. 10 and FIG. 11, the strap attachment 1 includes a projection 49. The projection 49 generally prevents the slide movement in the removal direction opposite to the insertion direction in the attached state in which the strap attachment 1 is attached to the controller, the details of which will be described later. With the projection 49, it is possible to reduce the possibility of the strap attachment 1 coming off the controller.

As shown in FIG. 11, the projection 49 includes projecting members 49a and a substrate 49b. The substrate 49b is a plate-shaped member and is provided on the inner side (i.e., on the x-axis positive direction side) of the rail member 43. The projecting members 49a are provided on the front side (i.e., the x-axis negative direction side) surface of the substrate 49b. In the present embodiment, two projecting members 49a are provided on both sides of the substrate 49b in the direction perpendicular to the slide direction (i.e., on the z-axis positive direction side and on the z-axis negative direction side). Note that as shown in FIG. 11, two holes 43c are provided on the bottom surface portion 61 of the rail member 43. The two projecting members 49a are provided so that the projecting members 49a can protrude respectively through the holes 43c. Thus, the projection 49 is provided so that a portion thereof can protrude through the bottom surface portion of the rail member 43.

Note that in other embodiments, the projection 49 (specifically, the projecting members 49a) may be provided so that it can protrude through the side surface portion 62 of the rail member or protrude through the opposing portion 63. Specifically, the projection 49 may be provided so as to protrude from the hole in one of the two side surface portions 62a and 62b toward the other one of the two side surface portions 62a and 62b. The projection 49 may be provided so as to protrude from the hole in one of the two opposing portions 63a and 63b toward the other one of the two opposing portions 63a and 63b. The projection 49 may be provided so as to protrude from the hole in the opposing portion 63 toward the bottom surface portion 61.

As shown in FIG. 10 and FIG. 11, the projection 49 is provided in a lower end portion (i.e., a portion on the y-axis negative direction side) of the rail member 43. Specifically, the projection 49 is provided at a position such that the projecting members 49a can engage with the lower end (i.e., the end portion on the y-axis negative direction side) of the slider (specifically, the top surface portion 32) of the controller in the attached state (see FIG. 15(c)). Note that in other embodiments, there is no particular limitation on the position (strictly speaking, the position of the controller) at which the projection 49 engages with the controller in the attached state. For example, when the projection 49 engages at a position along the slider other than the lower end thereof, the projection 49 does not need to be provided in a lower end portion of the rail member 43.

Figure 15:
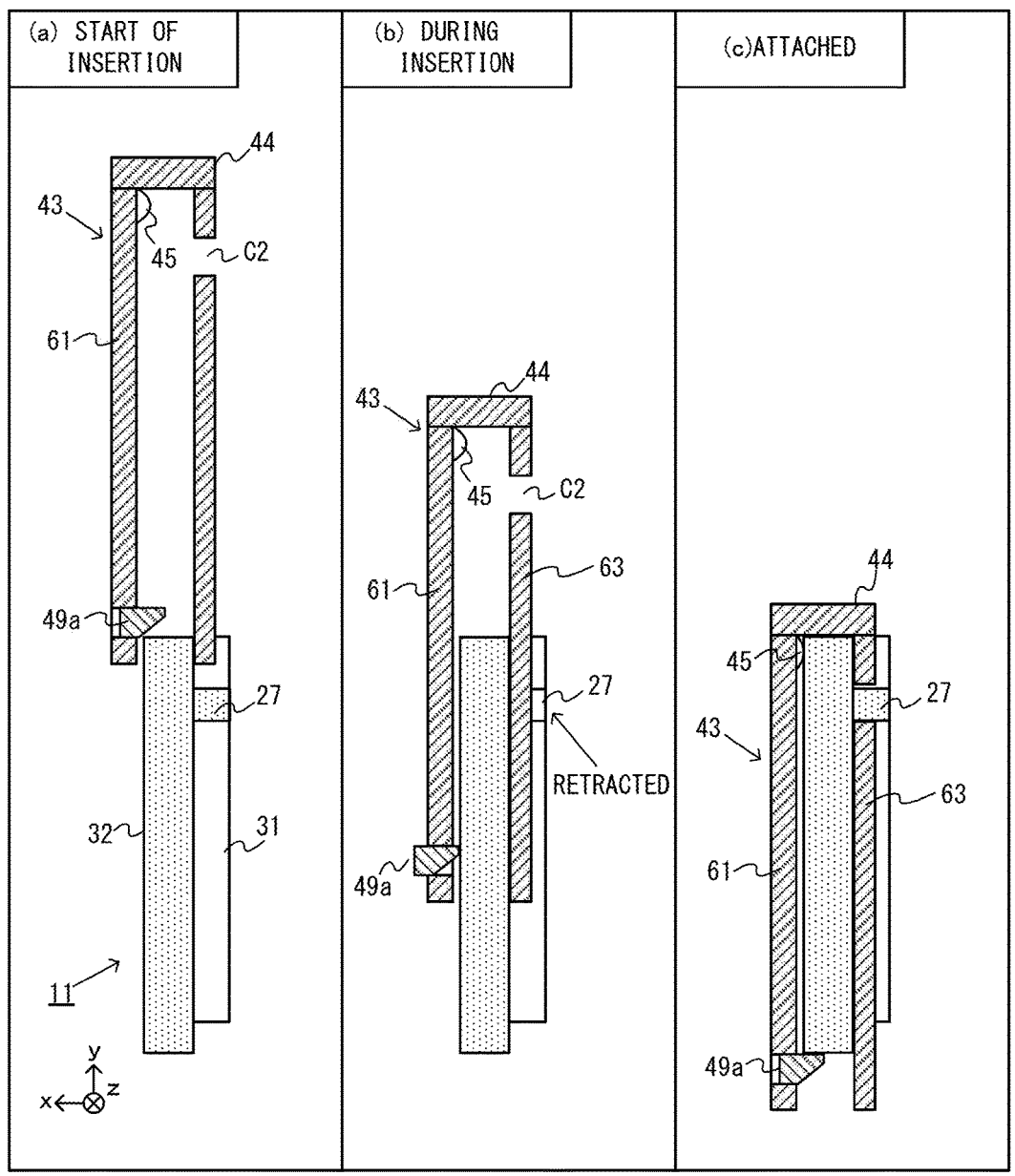
FIG. 15 schematically shows an example operation of connecting together a slider and a rail member.

In the present embodiment, the projection 49 is configured so that the projection 49 can move between the fifth position and the sixth position (see FIG. 15). The fifth position is a position where the projecting members 49a are more protruding than at the sixth position. That is, the projection 49 at the fifth position is more protruding, than the projection 49 at the sixth position, from the bottom surface of the rail member 43 where the projection 49 is provided. As will be described later, when the projection 49 is at the fifth position, the projection 49 engages with the slider of the controller in the attached state. When the projection 49 is at the sixth position, the projection 49 does not engage (or not substantially engage) with the slider of the controller in the attached state. At the sixth position, the projecting members 49a may be retracted inside the holes 43c of the bottom surface of the rail member 43, or the projecting members 49a may be slightly protruding from the bottom surface.

In the present embodiment, the projection 49 is biased by an elastic part into the protruding state at the fifth position. Specifically, the projection 49 is biased by a spring 50, which is an example elastic part (see FIG. 11). As shown in FIG. 11, the spring 50 is provided on the reverse side (i.e., the x-axis positive direction side) of the substrate 49b. The spring 50 is arranged inside the housing 41. By means of the spring 50, the projection 49 is biased to protrude from the bottom surface portion 61.

The projection 49 (specifically, the projecting members 49a) is provided so that a surface thereof on the insertion side (i.e., the y-axis negative direction side) is sloped (see FIG. 15). Note that this surface will be referred to hereinafter as the "slope". Specifically, the projection 49 may be sloped so that the height of the surface relative to the insertion side gradually decreases toward the insertion side. Then, when the slider of controller is inserted into the rail member 43, the projection is unlikely interfered by the slider, thereby enabling smooth slide movement.

(Elastic Member)

As shown in FIG. 10 and FIG. 11, the strap attachment 1 includes an elastic member 45. In the present embodiment, the elastic member 45 is provided on the bottom surface of the rail member 43. Specifically, a hole runs through the housing 41 and the rail member 43, and the elastic member 45 is provided so as to protrude through the hole and past the bottom surface of the rail member 43 (see FIG. 11).

The elastic member 45 is in contact with the slider of the controller in the attached state. That is, in the attached state, the elastic member 45 applies a force, on the slider, in the direction away from the bottom surface of the rail member 43 (see FIG. 15). Therefore, it is possible with the elastic member 45 to reduce the looseness between the controller and the strap attachment 1, enabling a firmer connection between the controller and the strap attachment 1. Also, it is possible to reduce the noise ("chattering") produced when the controller is vibrated by a vibrator (not shown).

In the present embodiment, the elastic member 45 is formed from a rubber. Therefore, in the present embodiment, even when the elastic member 45 hits the slider, it unlikely damages the slider. Note that in other embodiments, the elastic member 45 may be formed from any other elastic material, e.g., a leaf spring of a metal or a resin.

In the present embodiment, the elastic member 45 is provided on the upper end side (i.e., the y-axis positive direction side) of the center of the rail member 43. More specifically, the elastic member 45 is provided in an upper end portion of the rail member 43. Then, when the slider is inserted into the rail member 43, it is possible to shorten the period over which the elastic member 45 is in contact with the slider. Therefore, a user can smoothly slide the slider. Note that there is no particular limitation on the position at which the elastic member 45 is arranged, and in other embodiments, it may be provided in a lower end portion of the rail member 43. The elastic member 45 may be provided on the side surface portion 62 or the opposing portion 63 of the rail member 43.

(Attachment Operation)

Next, referring to FIG. 15, the operation of attaching the strap attachment 1 to the controller will be described using, as an example, the operation of attaching the strap attachment 1 to the right controller 4. FIG. 15 schematically shows an example operation of connecting together a slider and a rail member. FIG. 15 is a cross-sectional view taken along line A-A' of FIG. 14, showing the slider 11 and the rail member 43.

FIG. 15(a) shows a state immediately after the slider 11 starts to be inserted into the rail member 43. As shown in FIG. 15(a), in order to attach the strap attachment 1 to the right controller 4, the upper end of the slider 11 is first inserted into the lower end side (i.e., the y-axis negative direction side) of the rail member 43. Note that the projection 27 of the right controller 4 is at this point in the protruding state. At this point, the projecting member 49a of the projection 49 is not in contact with the slider 11, and it is biased by the spring 50 into the fifth position described above (i.e., the state in which it is protruding from the bottom surface portion 61 of the rail member 43).

When the strap attachment 1 is attached to the right controller 4, the slider 11 is slid from the position shown in FIG. 15(a) in the insertion direction (i.e., the direction in which the slider 11 moves toward the stopper portion 44 at the end of the rail member 43). As described above, the lower end portions of the opposing portions 63 of the rail member 43 are tapered so that the gap therebetween gradually increases toward the distal end (see FIG. 14). Thus, when the projection 27 of the slider 11 comes into contact with the opposing portion 63 of the rail member 43, the projection 27 is unlikely interfered by the opposing portion 63.

FIG. 15(*b*) shows a state in which the slider 11 is inserted halfway through the rail member 43 (the attached state has not been reached). In this state, the projection 27 is in the retracted state, having come into contact with the opposing portion 63 of the rail member 43. In this state, the projecting member 49*a* has been moved into the sixth position by the slider 11. Note that as described above, the projecting member 49*a* has a slope. Therefore, when the slider 11 comes into contact with the projecting member 49*a*, the slider 11 first hits the slope, and the slider 11 is unlikely interfered by the projecting member 49*a*. As the slider 11 is further slid in the insertion direction from the position of FIG. 15(*b*), the right controller 4 and the strap attachment 1 come into the attached state.

FIG. 15(*c*) shows the attached state in which the strap attachment 1 is attached to the right controller 4. In the attached state, the projection 49 is no longer pressed by the slider 11, and the projecting members 49*a* are therefore in the fifth position, protruding from the bottom surface of the rail member 43 as shown in FIG. 15(*c*). Therefore, if one attempts to slide the slider 11 in the removal direction, the slider 11 hits the projection 49. Thus, in the present embodiment, it is possible with the projection 49 to generally prevent the slide movement of the slider 11 in the removal direction.

As described above, in the present embodiment, the projection 49 is biased by an elastic part (i.e., the spring 50) into the fifth position (in other words, a position at which the projection 49 generally prevents the slide movement of the slider of the controller). Then, in the attached state, the projection 49 in the protruding state can generally prevent the slide movement of the slider of the controller (see FIG. 15).

Note that when a certain force or more is applied in the attached state for sliding the slider in the removal direction, the projection 49 moves into the sixth position, thereby releasing the engagement. Thus, a user can remove the strap attachment 1 from the controller by a simple operation.

As described above, in the attached state, since the projection 27 is located at the position of the cut-out portion C2 of the opposing portion 63, the projection 27 is in the protruding state. Therefore, in the present embodiment, the strap attachment 1 does not apply an unnecessary force on the projection 27 while in the attached state.

Note that when one attempts to slide the slider 11 in the removal direction in the attached state, the projection 27 hits the opposing portion 63. Therefore, in the present embodiment, it can be said that the slide movement of the slider 11 in the removal direction is also generally prevented by the projection 27 and the opposing portion 63. Note that in the present embodiment, the contact surface 631 of the opposing portion 63 is provided so that the gap between the two opposing portions 63*a* and 63*b* gradually narrows in the downward direction (see FIG. 14). This limits the capability of the projection 27 and the opposing portion 63 of generally preventing the slide movement.

As shown in FIG. 15(*c*), since the slider 11 is pressed by the elastic member 45 in the attached state, it is possible to reduce the looseness between the controller and the strap attachment 1.

(3-3: Elements Regarding Strap)

As shown in FIG. 10 and FIG. 11, the strap attachment 1 includes the strap 47. The strap 47 is a cord-like member such as a cord or a rope, and has a loop shape. As described above, the strap 47 is put on the wrist when a user holds a strap-attached controller device.

In the present embodiment, the strap 47 is fixedly fastened to the housing 41. Specifically, as shown in FIG. 11, a shaft portion 41*e*, threaded inside for receiving the screw 55, is provided inside the housing 41 (specifically, the first member 41*a*). As shown in FIG. 10, a hole 41*f* is provided in the housing 41 (specifically, the first member 41*a*). The strap 47 is hooked on the shaft portion 41*e*, extending out of the housing 41 through the hole 41*f*. Thus, in the present embodiment, the strap 47 can be fixedly fastened to the housing 41. According to the present embodiment, the strap 47 can be securely fastened to the housing 41.

Note that in other embodiments, the strap attachment 1 may be configured so that the strap is removably attachable to the strap attachment 1. That is, the strap attachment 1 may include a strap anchor to which a strap can be fastened, instead of a strap (or in addition to a strap). For example, the strap anchor may be provided on the housing 41 and may include a hole. Then, a strap can be attached by passing the strap through the hole. Note that in the present embodiment, the strap 47 is fastened to the shaft portion 41*e*, and the shaft portion 41*e* is therefore equivalent to the strap anchor.

In the present embodiment, the strap attachment 1 includes the strap 47 (or the strap anchor to which the strap 47 is fastened) on the lower side of the center of the strap attachment 1 (more specifically, in a lower end portion of the housing 41). In other words, the strap 47 is fastened on the opposite side from the stopper portion 44 in the slide direction of the rail member 43. That is, the strap attachment 1 is attached to the controller by first inserting the lower side (where the strap 47 is fastened) of the strap attachment 1 into the upper side of the controller (see FIG. 5).

Consider a situation in which a user is performing an operation by holding and shaking the strap-attached controller device with the strap 47 put on the wrist. In this situation, when a user inadvertently lets go of the strap-attached controller device, the strap attachment 1 stops moving because the strap 47 is on the wrist, whereas the controller is urged to continue moving. Thus, the controller is under a force urging the controller to move relative to the strap attachment 1. In the present embodiment, however, since the strap 47 is fastened on the opposite side from the stopper portion 44 in the slide direction, the above force urges the controller to move in the insertion direction.

As described above, by providing the strap 47 (or the strap anchor) on the opposite side from the stopper portion 44 in the slide direction of the rail member 43, it is possible to prevent the controller from moving in such a direction that the controller comes off the strap attachment 1.

As shown in FIG. 10, the strap 47 includes an adjustment 48 in the present embodiment. The adjustment 48 is a member used for adjusting the length of the loop of the cord-like member of the strap 47. Specifically, the adjustment 48 includes an adjustment button 48*a*. Although there is no particular limitation on the specific mechanism of the adjustment 48, in the present embodiment, the adjustment 48 can be moved easily on the cord-like member of the strap 47 while the adjustment button 48*a* is pressed, whereas the adjustment 48 can be fixed (in other words, can be made less movable) on the cord-like member of the strap 47 while the adjustment button 48*a* is not pressed. Thus, a user can adjust the length of the loop of the cord-like member by using the adjustment 48 so that the strap 47 will not slip off the wrist.

(3-4: Elements Regarding Buttons)

As shown in FIG. 10 and FIG. 11, the strap attachment 1 includes the first button 51 and the second button 52. These buttons 51 and 52 are provided so as to allow the second L button and the second R button of the controller to be operated when the strap attachment 1 is attached to the controller.

As shown in FIG. 10, the buttons 51 and 52 are provided so as to protrude from the button provision surface of the housing 41. The first button 51 is provided at a position on the button provision surface on the lower side of the center in the up-down direction (i.e., the y-axis direction). The second button 52 is provided at a position on the button provision surface on the upper side of the center in the up-down direction.

The buttons 51 and 52 are biased to protrude from the button provision surface. Specifically, as shown in FIG. 11, the first button 51 is biased by a spring 53 provided inside the housing 41, and the second button 52 is biased by a spring 54 provided inside the housing 41. When the button 51 or 52 is not pressed, the operation surface thereof (i.e., the surfaces on the x-axis positive direction side) is protruding from the button provision surface by a predetermined first distance. The button 51 or 52 can be pressed by a user up to such a position that the operation surface thereof is at a predetermined second distance (the second distance is shorter than the first distance) from the button provision surface.

As shown in FIG. 11, the first button 51 includes a first actuation portion 51*a*. The first actuation portion 51*a* is provided so as to protrude toward the opposite side from the operation surface of the first button 51. The first actuation portion 51*a* is configured so that it can move from a first position (FIG. 16(*a*)) to a second position (FIG. 16(*b*)) in response to the first button 51 being pressed. The second button 52 includes a second actuation portion 52*a*. The second actuation portion 52*a* is provided so as to protrude toward the opposite side from the operation surface of the second button 52. The first actuation portion 52*a* is configured so that it can move from a third position to a forth position in response to the second button 52 being pressed. Each of the actuation portions 51*a* and 52*a* is a rod-shaped member.

As shown in FIG. 11, holes 43*a* and 43*b* are provided running through the rail member 43 and the housing 41 (specifically, the second member 41*b*). The first actuation portion 51*a* is provided so that the first actuation portion 51*a* can protrude past the bottom surface of the rail member 43 through the hole 43*a*. The second actuation portion 52*a* is provided so that the second actuation portion 52*a* can protrude past the bottom surface of the rail member 43 through the hole 43*b*. The position at which the first actuation portion 51*a* protrudes from the bottom surface substantially corresponds to the second L button 21 of the right controller 4 (or the second R button of the left controller 3) in the attached state. That is, the position at which the first actuation portion 51*a* protrudes from the bottom surface is facing the position of the second L button 21 in the attached state, and is the same position as that of the second L button 21 in the attached state with respect to the up-down direction (i.e., the y-axis direction) and the front-rear direction (i.e., the z-axis direction). Similar to the first actuation portion 51*a*, the position at which the second actuation portion 52*a* protrudes from the bottom surface corresponds to the second R button 22 of the right controller 4 (or the second L button of the left controller 3) in the attached state.

Note that as shown in FIG. 11 (and FIG. 16 to be discussed later), the cross-sectional area of the actuation portion along the cross section perpendicular to the direction of protrusion (specifically, the cross-sectional area along the cross section parallel to the yz plane) is smaller than the area of the operation surface of the button on which the actuation portion is provided. Then, the holes 43*a* and 43*b* through which the actuation portions 51*a* and 52*a* pass can be made smaller than the operation surfaces of the buttons 51 and 52. In other words, it is possible to increase the size of the buttons 51 and 52 for easier operations without increasing the size of the holes 43*a* and 43*b* to be provided running through the rail member and/or the housing.

Figure 16:
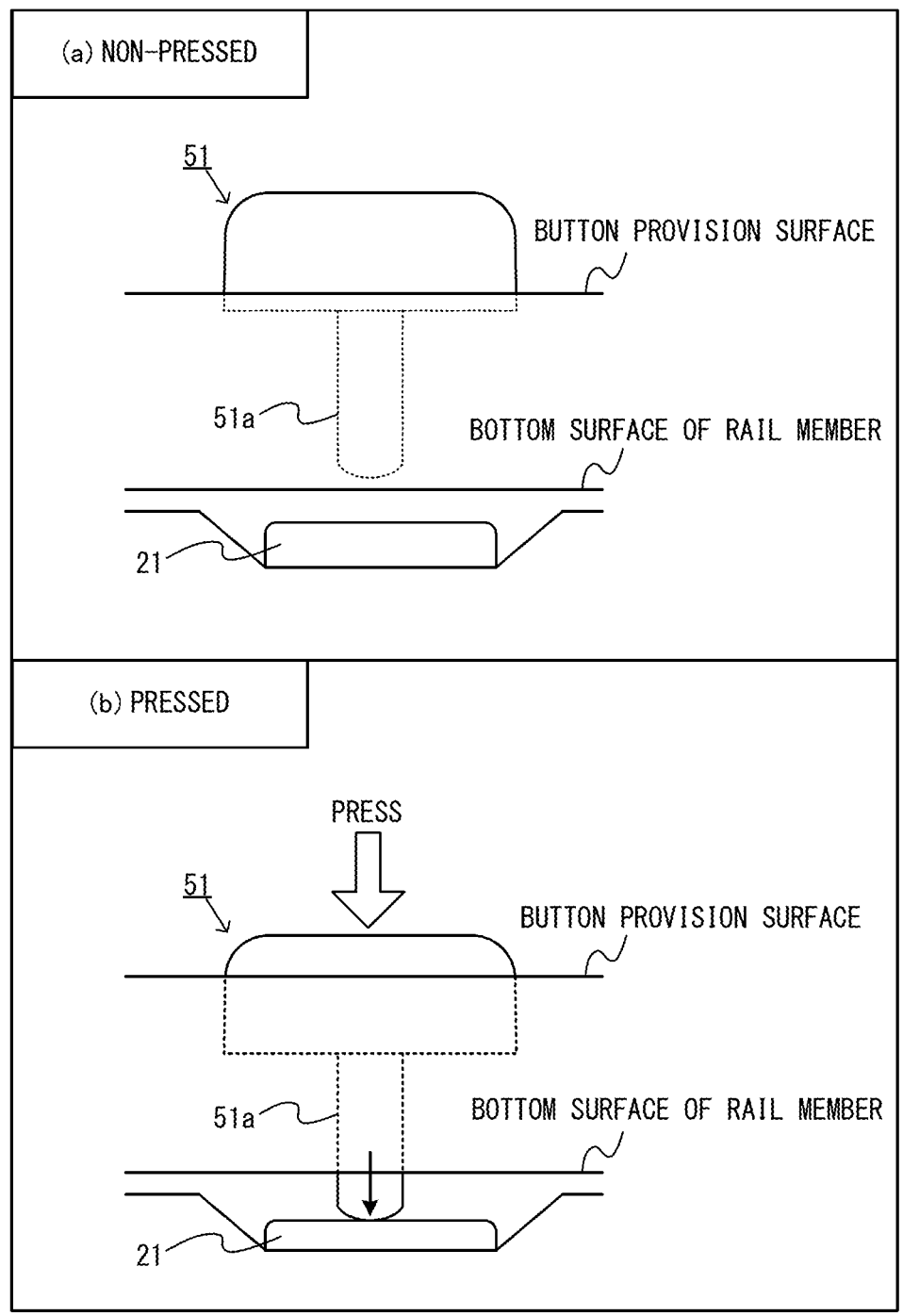
FIG. 16 schematically shows an example of how a button on a controller is pressed by a button on a strap attachment.

FIG. 16 schematically shows an example of how a button on the controller is pressed by a button on the strap attachment. Note that although FIG. 16 shows an example where the right controller 4 is attached to the strap attachment 1 and the second L button 21 is pressed by the first button 51, the above description holds true also for other cases (i.e., where the second R button of the left controller 3 is pressed by the first button 51, where the second L button of the left controller 3 is pressed by the second button 52, and where the second L button of the right controller 4 is pressed by the second button 52).

FIG. 16(*a*) shows a state in which the first button 51 is not pressed (non-pressed state). In the non-pressed state, the first actuation portion 51*a* is not protruding past the bottom surface of the rail member 43 but is retracted inside the housing 41. Therefore, the second L button 21 is not pressed by the first actuation portion 51*a*.

On the other hand, FIG. 16(*b*) shows a state in which the first button 51 is pressed (pressed state). In the pressed state, the first actuation portion 51*a* is protruding past the bottom surface of the rail member 43. Then, the first actuation portion 51*a* presses the second L button 21. That is, in the attached state, a user can press the first button 51, thereby in turn pressing the second L button 21.

As described above, in the present embodiment, even when the strap attachment 1 is attached to the controller, a user can press buttons provided on the strap attachment 1 to thereby operate the second L button and the second R button on the controller (which are hidden by the strap attachment 1).

Note that when a user holds the strap-attached controller device using both hands, a user can operate the first button 51 and the second button 52 using the index finger and/or the middle finger, for example. That is, a user can operate the buttons 51 and 52 using the same fingers as those used when operating the second L button and the second R button when the strap attachment 1 is not attached.

In the present embodiment, the area of the operation surface of a button on the strap attachment 1 (i.e., the first button 51 or the second button 52) is greater than the area of the operation surface of a button on the controller (i.e., the second L button or the second R button). Therefore, in the present embodiment, it is easier for a user to press a button on the strap attachment 1 attached to the controller than to directly press a button on the controller. That is, it is possible to improve the controllability of the controller by attaching the strap attachment 1 to the controller.

Note that in the present embodiment, the pairing button provided on the slider of the controller cannot be operated by a user when the strap attachment 1 is attached to the controller. This is because it is assumed that the pairing button is a button used when instructing a process regarding the wireless communication between the controller and the main unit 2 and that the pairing button is not used while operating the controller (e.g., during game operations). Note that in other embodiments, a button corresponding to the pairing button may be provided on the strap attachment 1 so as to allow the pairing button to be operated in the attached state.

Figure 17:
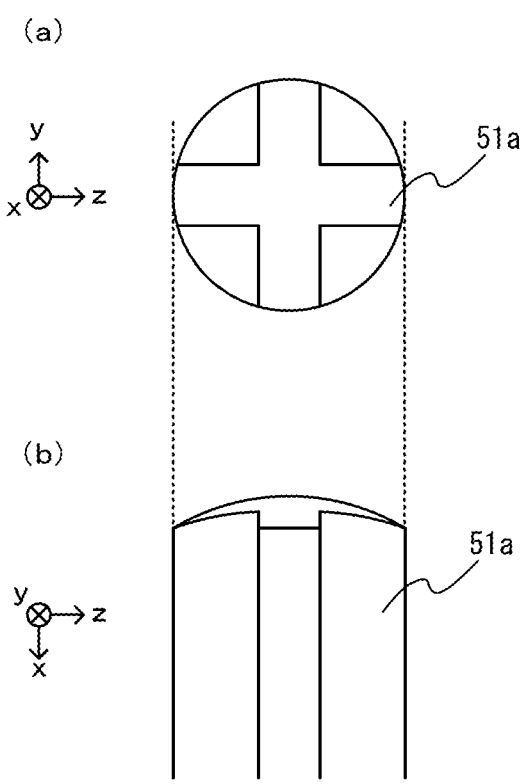
FIG. 17 shows a non-limiting example actuation portion.

FIG. 17 shows an example actuation portion. Note that while FIG. 17 shows the first actuation portion 51a shown in FIG. 11, the second actuation portion 52a has a similar shape to the first actuation portion 51a.

FIG. 17(a) shows the first actuation portion 51a as seen from the direction of protrusion (i.e., from the x-axis negative direction side). As shown in FIG. 17(a), the first actuation portion 51a has a cross-shaped cross section along a plane perpendicular to the direction of protrusion. Then, it is possible to reduce the volume of the actuation portion 51a while maintaining the mechanical strength thereof. Note that in other embodiments, the first actuation portion 51a may have a cylindrical shape or a columnar shape, for example.

FIG. 17(b) shows the first actuation portion 51a as seen from a direction perpendicular to the direction of protrusion (i.e., from the y-axis negative direction side). As shown in FIG. 17(b), the tip of the first actuation portion 51a has a curved surface (specifically, a curved surface such that the center thereof is protruding). Then, when a button on the controller is pressed by the actuation portion 51a, it is possible to reduce the possibility that the button on the controller is damaged by the actuation portion 51a.

(3-5: Elements Regarding Lightguide)

The strap attachment 1 includes elements for allowing a user to see the light from the indicator LEDs of the controller attached thereto. The indicator LED of each of the controllers 3 and 4 may be lit to indicate the number assigned to the controller, or may be lit to indicate the remaining battery level of the controller. In such a case, with the elements described above, a user can see the light from the indicator LED of the controller even if the strap attachment 1 is attached to the controller. This will be described below in detail.

As shown in FIG. 10, light-receiving ports 56 (i.e., holes in which the light-receiving surfaces of a lightguide member 58 shown in FIG. 11 are provided) are provided on the bottom surface of the rail member 43 (and the engaging surface of the housing 41). The number of the light-receiving ports 56 is equal to the number (herein, four) of indicator LEDs of the controller. The light-receiving ports 56 are provided at positions corresponding to the indicator LEDs of the controller attached to the strap attachment 1. That is, the positions of the light-receiving ports 56 are substantially opposing the positions of the indicator LEDs in the attached state, and are more specifically the same positions as those of the indicator LEDs in the attached state with respect to the up-down direction (i.e., the y-axis direction) and the front-rear direction (i.e., the z-axis direction).

As shown in FIG. 10, light-exiting ports 57 (i.e., holes in which light-exiting surfaces of the lightguide member 58 are provided) are provided on the housing 41. The light-exiting ports correspond to four light-receiving ports, and the number of light-exiting ports is equal to the number (herein, four) of the light-receiving ports. In the present embodiment, the light-exiting ports 57 are provided on the button provision surface of the housing 41 (see FIG. 10). More specifically, the light-exiting ports 57 are provided between the first button 51 and the second button 52. Note that in other embodiments, the light-exiting ports 57 may be provided on any surface that is different from the bottom surface (in other words, the engaging surface) of the rail member 43. For example, in other embodiments, the light-exiting ports 57 may be provided on the front surface or the rear surface of the housing 41.

As shown in FIG. 11, the strap attachment 1 includes the lightguide member 58 inside the housing 41. The lightguide member 58 is a transparent member (specifically, a lens) formed from a resin, for example. The lightguide member 58 includes a number of lenses equal to the number (herein, four) of the light-receiving ports 56 and the light-exiting ports 57. In the present embodiment, for easier production, the lightguide member 58 is an integrally-molded piece including four lenses connected together. Note however that in other embodiments, the lenses may be provided as separate pieces. As shown in FIG. 11, the lenses of the lightguide member 58 are arranged so that the light-receiving surfaces (i.e., surfaces on the x-axis negative direction side) are in the vicinity of the light-receiving ports 56, respectively, and the light-exiting surfaces (i.e., surfaces on the x-axis positive direction side) are in the vicinity of the light-exiting ports 57, respectively.

Note that in the present embodiment, the light-receiving surfaces of the lightguide member 58 are provided at positions sunken from the bottom surface of the rail member 43 (in other words, at positions that are closer to the center of the housing 41). Then, it is possible to reduce the possibility that the lightguide member 58 comes into contact with the controller when inserting the slider of the controller into the rail member 43, thereby allowing the strap attachment 1 to be smoothly attached to the controller.

Figure 18:
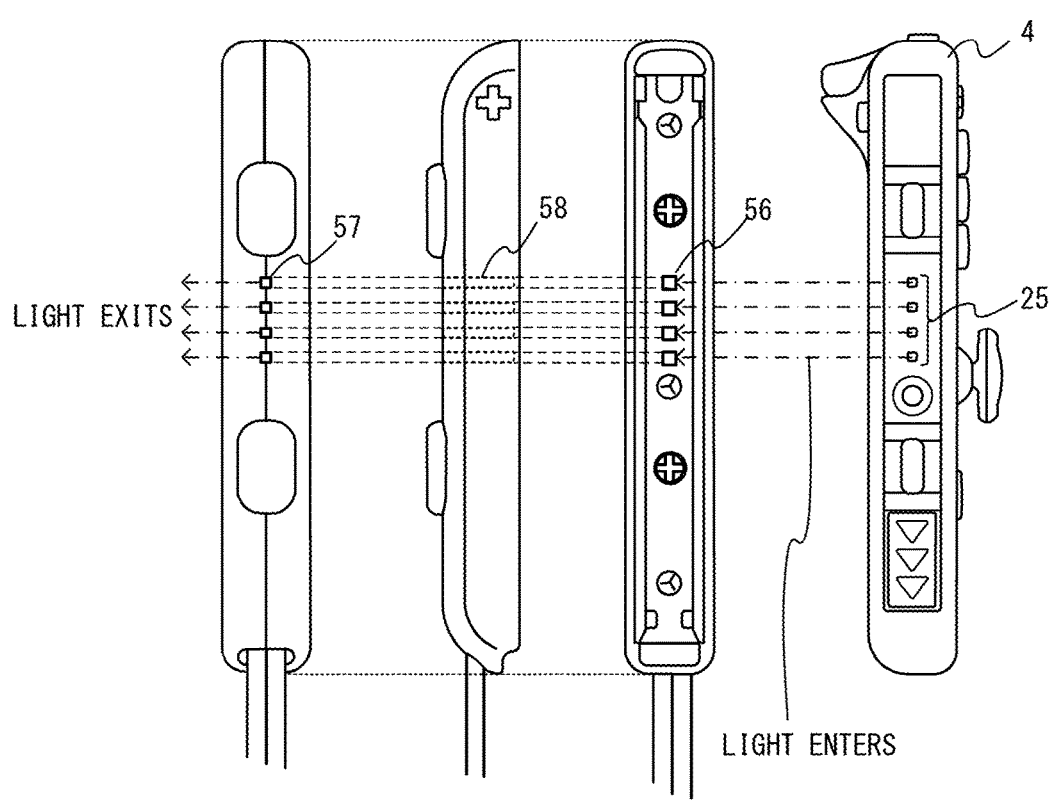
FIG. 18 shows an example of how light from indicator LEDs of a controller exits light-exiting ports of a strap attachment.

FIG. 18 shows an example of how light from the indicator LEDs of the controller exits the light-exiting ports of the strap attachment. For example, when an indicator LED 25 emits light with the strap attachment 1 attached to the right controller 4, the light from the indicator LED 25 enters the light-receiving surface of the lightguide member 58 through the light-receiving port 56 opposing the LED 25 that is lit. The lightguide member 58 guides light incident upon the light-receiving surface to the light-exiting surface by virtue of internal reflection, and the light exits the light-exiting surface. Thus, light is output from the light-exiting port 57.

Note that in other embodiments, the lightguide member 58 may be any member capable of guiding light incident upon the light-receiving port 56 to the light-exiting port 57. For example, in other embodiments, the lightguide member may be a mirror provided on the wall of the holes connecting between the light-receiving ports 56 and the light-exiting ports 57.

As described above, in the present embodiment, the strap attachment 1 includes a lightguide portion (herein, the lightguide member 58) for guiding light incident on a light-receiving port 56 provided on the bottom surface of the rail member 43 to a light-exiting port provided on a surface (herein, the button provision surface) different from the bottom surface. Then, even when the strap attachment 1 is attached to the controller, the light from an indicator LED of the controller can be presented to a user, as when the strap attachment 1 is not attached to the controller. By the provision of the lightguide portion, it is possible to present to a user information indicated by the indicator LEDs of the controller to which the strap attachment 1 is attached using a simple configuration (e.g., as compared with an embodiment in which the strap attachment 1 receives information regarding indicator LEDs from the controller so as to control indicator LEDs of the strap attachment 1 based on the received information).

Note that in the present embodiment, the light-exiting ports 57 are provided on the button provision surface of the housing 41 (see FIG. 10). Then, the orientation of the light-exiting ports of the strap attachment 1 attached to the controller is the same as the orientation of the indicator LEDs of the controller, and it is therefore possible to present light from the light-exiting ports in such a manner that the light is easy for a user to see.

In the present embodiment, the light-exiting ports 57 are provided on the button provision surface between the first button 51 and the second button 52 (see FIG. 10). Then, the positional relationship between the two buttons 51 and 52 and the light-exiting ports 57 on the strap attachment 1 can be made the same as the positional relationship between two buttons (i.e., the second L button and the second R button) and the indicator LEDs on the controller. Then, a user can operate the controller in the same fashion whether or not the strap attachment 1 is attached to the controller, thus improving the controllability of the controller when the strap attachment 1 is attached thereto.

In the present embodiment, light from a plurality of indicator LEDs of the controller is output from a plurality of light-exiting ports 57 corresponding respectively to the indicator LEDs. Therefore, in the present embodiment, a user can recognize which one or ones of the indicator LEDs are lit.

Note that in other embodiments, the strap attachment 1 may include one light-receiving port and one light-exiting port even though the controller includes a plurality of indicator LEDs. Then, when any of the indicator LEDs of the controller is lit, light is output from the light-exiting port of the strap attachment 1. Then, although it is not possible to indicate which one of the indicator LEDs of the controller is lit, it is possible to indicate to a user that at least one of the indicator LEDs is lit. Depending on the content of information to be indicated by indicator LEDs to a user, this configuration may suffice.

Note that in other embodiments, partitions may be provided between a plurality of light-receiving ports (in other words, a plurality of light-receiving surfaces) arranged next to each other. Then, it is possible to reduce the possibility that light from one indicator LED is incident upon another light-receiving port that is different from the corresponding light-receiving port, and it is possible to reduce the possibility that light is output from a light-exiting surface that does not correspond to the indicator LED that is lit.

[4. Functions/Effects and Variations of Present Embodiment]

In the embodiment described above, the strap attachment 1 is an attachment attachable to a game controller (e.g., the right controller 4) having a controller-side slide portion (e.g., the slider 11) that includes a controller-side first operation button (e.g., the second L button 21) and a controller-side second operation button (e.g., the second R button 22). The strap attachment 1 includes the following elements:

a strap;

an attachment-side slide portion (e.g., the rail member 43) on a first surface (e.g., the engaging surface) of the attachment, the attachment-side slide portion having a first side of a center of the attachment-side slide portion and a second side of a center of the attachment-side slide portion opposite to each other in a predetermined slide direction (e.g., the y-axis direction shown in FIG. 10), wherein the attachment-side slide portion is configured to slidably engage with a controller-side slide portion in the slide direction, and wherein the controller-side slide portion is insertable into the attachment-side slide portion from the first side (e.g., the y-axis negative direction side shown in FIG. 10);

a stopper portion (e.g., the stopper portion 44 shown in FIG. 11) on the second side (e.g., the y-axis positive direction side shown in FIG. 10) of the center of the attachment-side slide portion and configured to limit the slide movement, in an insertion direction, of the controller-side slide portion which has been inserted from the first side of the attachment-side slide portion;

a lock portion (e.g., the projection and/or the contact surfaces 631a and 631b) configured to resist the slide movement, in a removal direction opposite to the insertion direction, while the slide movement of the controller-side slide portion is substantially limited by the stopper portion;

an attachment-side first operation button (e.g., the first button 51) on a second surface on a reverse side from the first surface (e.g., the button provision surface); and an attachment-side second operation button (e.g., the second button 52) on the second surface.

The attachment-side first operation button includes a first actuation portion (e.g., the first actuation portion 51a shown in FIG. 11) configured to move from a first position to a second position, thereby pressing a game controller-side first operation button, in response to an operation of pressing the attachment-side first operation button. The attachment-side second operation button includes a second actuation portion (e.g., the second actuation portion 52a shown in FIG. 11) configured to move from a third position to a fourth position, thereby pressing a game controller-side second operation button, in response to an operation of pressing the attachment-side second operation button.

As described above, with the slide portion of the attachment and the slide portion of the game controller engaged with each other, a user can easily detach the attachment (including the strap) from the game controller. That is, it is possible to easily detach the strap from the game controller.

The term "slide member" may refer to the rail member or the slider as used in the embodiment described above. Note that in the embodiment described above, a slide member provided on the strap attachment 1 and a slide member provided on the controller are referred to as a "rail member" and a "slider", respectively, so that these members can easily be distinguished from each other. The shape of the rail member and that of the slider are not limited to those of the embodiment described above. For example, a slide member having a cross section shaped as shown in FIG. 12 may be referred to as a "slider", and a slide member having a T-shaped cross section as shown in FIG. 9 may be referred to as a "rail member".

Note that in the embodiment described above, the rail member, which is an example slide member, is provided on the engaging surface of the housing 41, and is configured to have the bottom surface portion, the side surface portion and the opposing portion. In other embodiments, the housing and the rail member (in other words, the slide member) may be configured as follows. That is, the strap attachment 1 may include a member A (e.g., the first member 41a described above) forming a part of the housing and including an opening, and a member B (e.g., the rail member 43 described above) including the bottom surface portion, the side surface portion and the opposing portion. Then, the bottom surface portion of the member B is connected to the member A so as to cover at least a portion of the opening of the member A. With such a configuration, the surface of the bottom surface portion of the member B corresponds to the "first surface" described above, and the side surface portion and the opposing portion of the member B correspond to the "rail member" described above. Thus, the rail member may not have the bottom surface portion. For example, the strap attachment 1 may be configured so that the rail member includes the side surface portion and the opposing portion (while not including the bottom surface portion), wherein the side surface portion is connected to the engaging surface of the housing.

According to the above description, since the attachment includes the actuation portion, a user can operate operation buttons on the game controller by pressing the operation buttons provided on the attachment even if the attachment is attached to the game controller.

According to the above description, since the attachment includes the lock portion, it is possible to reduce the possibility that the attachment comes off the game controller as a result of the controller-side slide portion, which has been inserted into the attachment-side slide portion, moving in the removal direction.

Note that "resisting (the slide movement)" as used herein means limiting (in other words, generally preventing) the slide movement through engagement between one member and another member. Note however that "resisting (the slide movement)" means to prevent the slide movement with a force less than a certain level, and means that the slide movement may be allowed when a force greater than a certain level is applied (thereby releasing the engagement).

In the embodiment described above, the game controller includes the projection (e.g., the projection 27 shown in FIG. 8). In the embodiment described above, it can be said that the contact surfaces 631a and 631b of the opposing portion 63 are serving as the lock portion described above. That is, the lock portion is on the second side (e.g., the y-axis positive direction side shown in FIG. 10) of the center of the attachment-side slide portion, and has a shape (see FIG. 14) configured to engage with a projection on the game controller (see FIG. 15) while the slide movement of the controller-side slide portion is substantially limited by the stopper portion.

Then, when the attachment is attached to the game controller including the projection, the slide movement can be generally prevented, thus reducing the possibility that the attachment comes off the game controller.

In the embodiment described above, the attachment-side slide portion includes a bottom surface (e.g., the bottom surface 61a shown in FIG. 12) substantially parallel to the slide direction, two side surfaces (e.g., the side surfaces of the side surface portion 62 shown in FIG. 12) each being substantially parallel to the slide direction and extending from the opposite sides of the bottom surface, and two opposing portions (e.g., the opposing portion 63 shown in FIG. 12) extending from the two side surfaces, respectively, and each having a surface opposing the bottom surface. The lock portion is part of each of the two opposing portions (see FIG. 14).

According to the above description, with the attachment attached to the game controller, the projection engages with the lock portion whether the projection of the game controller is provided on the side of one opposing portion or on the side of the other opposing portion. This allows the attachment to be used with a wider variety of game controllers.

In the embodiment described above, it can be said that the projection described above of the strap attachment 1 serves as the lock portion. That is, the lock portion includes a projection provided on the first side (e.g., the y-axis negative direction side shown in FIG. 10) of the center of the attachment-side slide portion, and the projection can engage with the controller-side slide portion while the slide movement is substantially limited by the stopper portion.

Then, when the attachment is attached to the game controller, it is possible with the projection described above to generally prevent the slide movement, thereby reducing the possibility of the attachment coming off the game controller.

As described above, in the embodiment described above, the contact surfaces 631a and 631b of the opposing portion 63 and the projection both serve as the lock portion. Note that in other embodiments, the strap attachment 1 may include only one of the contact surfaces and the projection as the lock portion.

It can be said that the strap attachment 1 of the embodiment described above is an attachment attachable to a game controller (e.g., the right controller 4) having a controller-side slide portion (e.g., the slider 11). The strap attachment 1 includes the following elements:

an attachment-side slide portion (e.g., the rail member 43) on a first surface (e.g., the engaging surface) of the attachment, the attachment-side slide portion having a first side of a center of the attachment-side slide portion and a second side of the center of the attachment-side slide portion opposite to each other in a predetermined slide direction (e.g., the y-axis direction shown in FIG. 10), wherein the attachment-side slide portion is configured to slidably engage with a controller-side slide portion in the slide direction, and wherein the controller-side slide portion is insertable into the attachment-side slide portion from the first side (e.g., the y-axis negative direction side shown in FIG. 10);

a stopper portion (e.g., the stopper portion 44 shown in FIG. 11) on the second side of the center of the attachment-side slide portion and configured to limit the slide movement, in an insertion direction, of the controller-side slide portion which has been inserted from the first side of the attachment-side slide portion; and a strap anchor (e.g., the shaft portion 41e shown in FIG. 11) to which a strap can be fastened, wherein the strap anchor is on a portion of the attachment which portion is on the same side of the center of the attachment in the slide direction as the first side.

Then, by engaging the slide portion of the attachment with the slide portion of the game controller, a user can easily detach the attachment (including the strap) from the game controller. If a strap is fastened to the strap anchor of the attachment, a user can detach the attachment from the controller, thereby removing the strap from the controller, without having to remove the strap from the attachment. That is, it is possible to easily detach the strap from the game controller.

(Variation Regarding Projection)

In the embodiment described above, the projection 49 for generally preventing the slide movement of the controller in the removal direction is biased into the fifth position (in other words, the protruding state). In other embodiments, the projection 49 may be configured so that the projection 49 can be switched between a state (called the "locked state") in which the movement from the fifth position to the sixth position is limited and another state (called the "unlocked state") in which the movement from the fifth position to the sixth position is allowed by means of an operation section (an operation lever to be described later) that can be operated by a user. A variation regarding the projection 49 will now be described.

Figure 19:
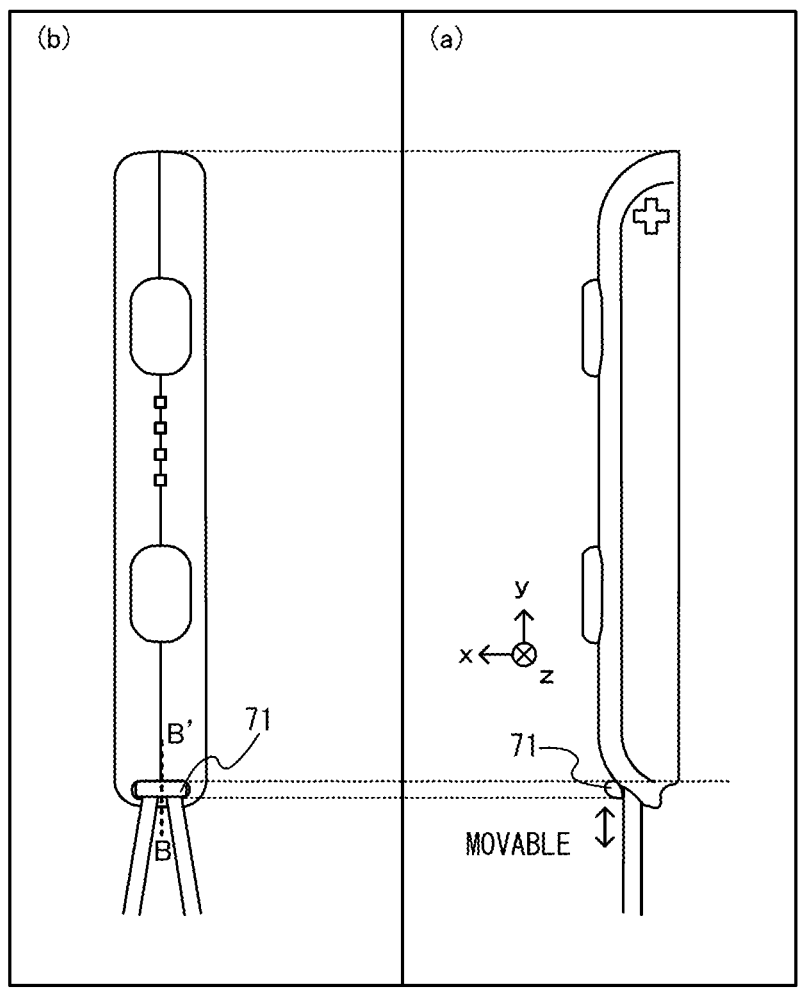
FIG. 19 shows a non-limiting example strap attachment according to a variation.
Figure 20:
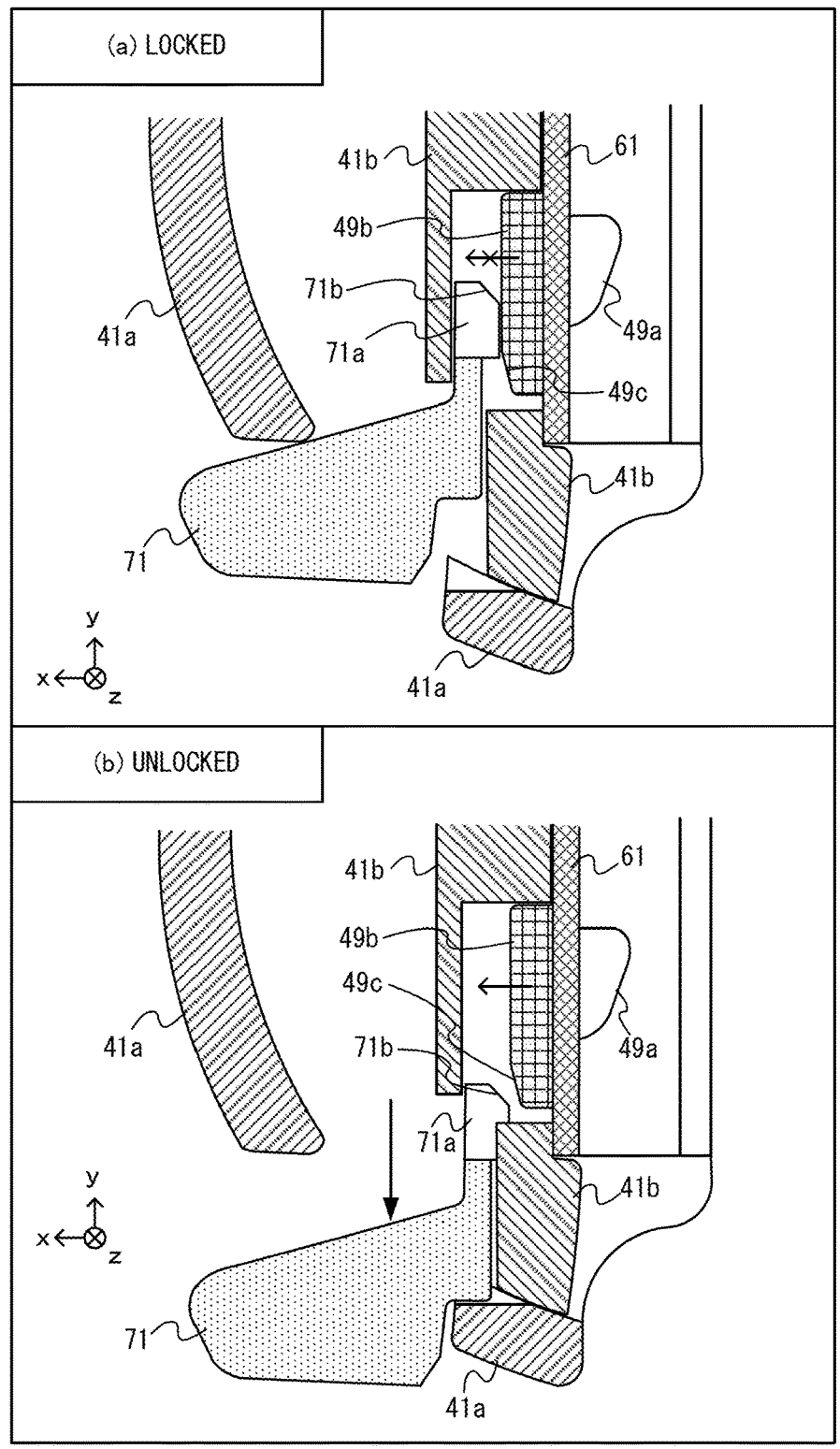
FIG. 20 is a cross-sectional view taken along line B-B' of FIG. 19.

FIG. 19 shows an example strap attachment according to a variation of the embodiment described above. FIG. 19 shows a front view (FIG. 19(a)) and a left side view (FIG. 19(b)) of the strap attachment. FIG. 20 is a cross-sectional view taken along line B-B' of FIG. 19. Note that in order to facilitate understanding of elements of interest to be discussed, FIG. 20 does not show some elements (e.g., the strap 47) of the strap attachment 1.

As shown in FIG. 19, in this variation, the strap attachment 1 includes an operation lever 71. The operation lever 71 is supported on the housing 41 so that the operation lever 71 can be moved by an operation by a user. In this variation, the operation lever 71 is provided so that the operation lever 71 can move in the up-down direction (i.e., the y-axis direction). More specifically, the operation lever 71 is movable between the upper position (i.e., the position shown in FIG. 20(a)) and the lower position (i.e., the position shown in FIG. 20(b)).

As described above, in this variation, the operation lever 71 is movable in a direction (i.e., the y-axis direction) that is different from the direction of movement of the buttons 51 and 52 (i.e., the x-axis direction). More specifically, the direction of movement of the operation lever 71 is substantially perpendicular to the direction of movement of the buttons. Thus, it is possible to reduce the possibility of the operation lever 71 being moved (thereby causing the strap attachment 1 to come off the controller, the details of which will be described later) when a user inadvertently touches the operation lever 71 while pressing down a button.

As shown in FIG. 19, the operation lever 71 is provided in the lower end portion of the strap attachment 1, i.e., in the vicinity of the area where the projection 49 is provided. Note that the strap 47 is provided in the vicinity of the operation lever 71. Therefore, although not shown in the figure, the operation lever 71 has a shape such that it does not interfere with the strap 47 (e.g., a shape with a hole through which the strap 47 can pass). Note that there is no particular limitation on the specific shape and material of the operation lever 71.

As shown in FIG. 20, the operation lever 71 includes a contact portion 71a. The contact portion 71a is provided inside the housing 41 (more specifically, in the vicinity of the reverse side of the substrate 49b of the projection 49). As shown in FIG. 20(a), when the operation lever 71 is in the upper position, the contact portion 71a is in contact with the reverse side surface of the substrate 49b of the projection 49. When the operation lever 71 is in the upper position, the contact portion 71a is sandwiched between the substrate 49b and the housing 41 (specifically, the second member 41b). In such a position, the projection 49 is in the locked state, and the movement from the fifth position to the sixth position is limited by the contact portion 71a (see an arrow shown in FIG. 20(a)). That is, while the operation lever 71 is in the upper position, the projection 49 remains in the fifth position.

Note that when the operation lever 71 is in the upper position, the contact portion 71a is pressed by the substrate 49b and the second member 41b. Thus, the operation lever 71 cannot be moved unless a force greater than a certain level is applied thereto. For example, the operation lever 71 in the upper position does not move to the lower position by virtue of its own weight. Moreover, the direction in which the projection 49 can be moved is substantially perpendicular to the direction in which the operation lever 71 (specifically, the contact portion 71a) can be moved. Therefore, even if a force is applied to the projection 49 urging the projection 49 to move from the fifth position to the sixth position (e.g., by a force urging the slider of the controller in the attached state to move in the removal direction), it is difficult for the operation lever 71 to move from the upper position to the lower position.

On the other hand, as shown in FIG. 20(b), when the operation lever 71 is in the lower position, the contact portion 71a retracts from the gap between the substrate 49b of the projection 49 in the fifth position and the second member 41b of the housing 41. Therefore, in this state, the projection 49 is in the unlocked state and is allowed to move from the fifth position to the sixth position. Note that in this variation, the spring 50 is absent on the reverse side of the substrate 49b.

In this variation, as shown in FIG. 20, the contact portion 71a has a slope 71b on the upper side (the y-axis positive direction side; in other words, the side of the end portion along the direction from the lower position to the upper position). That is, the upper end portion of the contact portion 71a is tapered away from the substrate 49b in the upward direction. As shown in FIG. 20, the substrate 49b has a slope 49c on the lower side (the y-axis negative direction side; in other words, the side of the end portion along the direction from the upper position to the lower position of the contact portion 71a). That is, the lower end portion of the substrate 49b is tapered away from the contact portion 71a in the downward direction. With these slopes 71b and 49c, the contact portion 71a is unlikely interfered by the substrate 49b while moving from the lower position to the upper position, realizing smooth movement. Note that in other embodiments, only one of the contact portion 71a and the substrate 49b may be provided with a slope. This also realizes similar effects to those of this variation. Note that in other embodiments, the contact portion 71a and the substrate 49b may be configured with no slope.

With the configuration of this variation, a user can switch the projection 49 between the locked state and the unlocked state by operating the position of the operation lever 71. That is, in the attached state, a user can set the operation lever 71 in the upper position to lock the projection 49, thereby generally preventing the slide movement of the slider in the removal direction by means of the projection 49. In the attached state, a user can set the operation lever 71 in the lower position to unlock the projection 49, thereby lifting the prohibition of the slide movement by the projection 49.

In this variation, when the strap attachment 1 is attached to the controller, a user sets the operation lever 71 in the lower position, and inserts the slider of the controller into the rail member 43 of the strap attachment 1. Note that also in this variation, as in the embodiment described above, the projecting member 49a may be provided with a slope so that the slider 11 is less likely to be interfered by the projecting member 49a.

After the slider of the controller is inserted into the rail member 43 of the strap attachment 1 to achieve the attached state, a user moves the operation lever 71 to the upper position. This locks the projection 49, thereby generally preventing the slide movement of the slider in the removal direction. A user leaves the operation lever 71 in the upper position while using the strap-attached controller device.

In order to detach the strap attachment 1 from the controller, a user moves the operation lever 71 to the lower position. This unlocks the projection 49, thereby lifting the prohibition of the slide movement by the projection 49, allowing a user to easily detach the strap attachment 1 from the controller.

As described above, in this variation, the strap attachment 1 includes an operation section (e.g., the operation lever 71) movable between the seventh position (e.g., the upper position) and the sixth position (e.g., the lower position) through an operation by a user. The operation section in the seventh position limits the movement of the projection 49 from the fifth position to the sixth position (FIG. 20(*a*)), and the operation section in the fourth position allows the projection 49 to move from the fifth position to the sixth position (FIG. 20(*b*)).

Then, by operating the position of the operation section, a user can switch between a state (e.g., the locked state described above) in which the projection can generally prevent the slide movement of the slide portion in the insertion direction and another state (e.g., the unlocked state described above) in which the projection does not generally prevent (or does not substantially prevent) the slide movement.

In the variation described above, the direction of movement of the projection 49 from the fifth position to the sixth position is substantially perpendicular to the direction of movement of the operation lever 71 from the seventh position to the fourth position (FIG. 20). The operation lever 71 in the seventh position is in contact with the projection 49 in the fifth position, thereby limiting the movement of the projection 49 from the fifth position to the sixth position. The operation lever 71 in the fourth position is not in contact with the projection 49 in the fifth position.

Then, it is possible to reduce the possibility of the operation lever 71 moving from the seventh position to the fourth position even if a force is applied to the projection 49 urging the projection 49 to move from the fifth position to the sixth position. Then, it is possible to reduce the possibility of the strap attachment 1 coming off the controller as a result of the operation lever 71 inadvertently moving from the seventh position to the fourth position against user's intention.

As described above, the embodiment described above is applicable to an attachment that can be attached to a game controller, for example, with the aim of making it easier to remove a strap, for example.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An attachment which is attachable to a game controller including a controller-side slide portion that includes a controller-side first operation button and a controller-side second operation button, the attachment comprising:
    a strap;
    an attachment-side slide portion on a first surface of the attachment, the attachment-side slide portion having a first side of a center of the attachment-side slide portion and a second side of the center of the attachment-side slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side;
    a stopper portion on the second side of the center of the attachment-side slide portion and configured to limit a slide movement, in an insertion direction, of the controller-side slide portion which has been inserted from the first side of the attachment-side slide portion;
    an lock portion configured to resist the slide movement, in a removal direction opposite to the insertion direction, while the slide movement of the controller-side slide portion is substantially limited by the stopper portion;
    an attachment-side first operation button on a second surface on a reverse side from the first surface; and
    an attachment-side second operation button on the second surface, wherein:
    the attachment-side first operation button includes a first actuation portion configured to move from a first position to a second position that extends into the attachment-side slide portion, thereby pressing the controller-side first operation button, in response to an operation of pressing the attachment-side first operation button; and
    the attachment-side second operation button includes a second actuation portion configured to move from a third position to a fourth position that extends into the attachment-side slide portion, thereby pressing the controller-side second operation button, in response to an operation of pressing the attachment-side second operation button.

2. The attachment according to claim 1, further comprising a strap anchor to which the strap can be fastened, wherein the strap anchor is on a portion of the attachment which is on the same side of a center of the attachment in the slide direction as the first side.

3. The attachment according to claim 1, wherein:
    the lock portion is on the second side of the center of the attachment-side slide portion, and has a shape configured to engage with a projection on the game controller while the slide movement of the controller-side slide portion is substantially limited by the stopper portion.

4. The attachment according to claim 3, the attachment-side slide portion including:
    a bottom surface substantially parallel to the slide direction;
    two side surfaces each substantially parallel to the slide direction and extending from opposite sides of the bottom surface; and
    two opposing portions extending from the two side surfaces, respectively, and each having a surface opposing the bottom surface,
    wherein the lock portion is part of each of the two opposing portions.

5. The attachment according to claim 4, wherein:
    the lock portion includes a contact surface with which a surface of the projection that is facing the first side is in contact while the slide movement of the controller-side slide portion is substantially limited by the stopper portion; and
    the contact surface is part of a boundary of a gap between the two opposing portions that gradually narrows toward the first side.

6. The attachment according to claim 1, wherein the lock portion includes a projection on the first side of the center of the attachment-side slide portion, and the projection is configured to engage with the controller-side slide portion while the slide movement is substantially limited by the stopper portion.

7. The attachment according to claim 6, wherein the projection includes a surface on the first side and sloped so that a height of the surface relative to the first side gradually decreases toward the first side.

8. The attachment according to claim 6, wherein:
    the projection is movable between a fifth position and a sixth position;

the projection in the fifth position protrudes more than the projection in the sixth position, thereby engaging with the controller-side slide portion while the slide movement is substantially limited by the stopper portion;

the attachment further comprises an operation section movable between a seventh position and a eighth position through an operation by a user; and the operation section in the seventh position limits movement of the projection from the fifth position to the sixth position, and the operation section in the eighth position allows the projection to move from the fifth position to the sixth position.

9. The attachment according to claim 8, wherein:
a direction of movement of the projection from the fifth position to the sixth position is substantially perpendicular to a direction of movement of the operation section from the seventh position to the eighth position; and the operation section in the seventh position is in contact with the projection in the fifth position, thereby limiting the movement of the projection from the fifth position to the sixth position, and the operation section in the fourth position is not in contact with the projection in the fifth position.

10. The attachment according to claim 1, wherein the attachment-side slide portion is a rail member that extends along the slide direction.

11. The attachment according to claim 1, wherein the attachment-side slide portion is metal.

12. The attachment according to claim 1, the attachment-side slide portion including:
a bottom surface substantially parallel to the slide direction;
two side surfaces each substantially parallel to the slide direction and extending from opposite sides of the bottom surface; and
two opposing portions extending from the two side surfaces, respectively, and each having a surface opposing the bottom surface,
wherein end portions of the two opposing portions on the first side are tapered so that a gap therebetween gradually increases toward a distal end.

13. The attachment according to claim 1, further comprising an elastic member on a bottom surface of the attachment-side slide portion, wherein the elastic member is configured to apply a force, in a direction away from the bottom surface, on the controller-side slide portion while the slide movement is substantially limited by the stopper portion.

14. The attachment according to claim 13, wherein the elastic member is on the second side of the center of the attachment-side slide portion.

15. The attachment according to claim 1, wherein an area of an operation surface of the attachment-side first operation button is larger than an area of the controller-side first operation button.

16. The attachment according to claim 1, wherein a tip of the first actuation portion has a curved surface.

17. The attachment according to claim 1, wherein the first actuation portion has a cross-shaped cross section along a plane perpendicular to a direction of movement from the first position to the second position.

18. The attachment according to claim 1, wherein opposite end portions of the second surface in the slide direction are each a rounded curved surface.

19. The attachment according to claim 1, further comprising:

a light-receiving port on a bottom surface of the attachment-side slide portion;
a light-exiting port on a surface of the attachment different from the bottom surface of the attachment-side slide portion; and
a lightguide portion configured to guide light incident upon the light-receiving port to the light-exiting port.

20. The attachment according to claim 19, wherein the light-exiting port is on the second surface.

21. The attachment according to claim 20, wherein the light-exiting port is on the second surface between the attachment-side first operation button and the attachment-side second operation button.

22. An attachment which is attachable to a game controller including a controller-side slide portion that includes a controller-side first operation button, the attachment comprising:

an attachment-side slide portion on a first surface of the attachment, the attachment-side slide portion having a first side of a center of the attachment-side slide portion and a second side of the center of the attachment-side slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side; and
an attachment-side first operation button on a second surface on a reverse side from the first surface,
wherein the attachment-side first operation button includes a first actuation portion configured to move from a first position to a second position that extends into the attachment-side slide portion, thereby pressing the controller-side first operation button, in response to an operation of pressing the attachment-side first operation button.

23. The attachment according to claim 22, further comprising a strap anchor to which a strap can be fastened.

24. The attachment according to claim 23, wherein the strap anchor is on a portion of the attachment which is on the same side of a center of the attachment in the slide direction as the first side.

25. The attachment according to claim 22, further comprising a stopper portion on the second side of the center of the attachment-side slide portion and configured to limit a slide movement, in an insertion direction, of the controller-side slide portion which has been inserted from the first side of the attachment-side slide portion.

26. An attachment which is attachable to a game controller including a controller-side slide portion, the attachment comprising:

an attachment-side slide portion on a first surface of the attachment, the attachment-side slide portion having a first side of a center of the attachment-side slide portion and a second side of the center of the attachment-side slide portion opposite to each other in a predetermined slide direction, wherein the attachment-side slide portion is configured to slidably engage with the controller-side slide portion in the slide direction, and wherein the controller-side slide portion is insertable into the attachment-side slide portion from the first side;
a stopper portion on the second side of the center of the attachment-side slide portion and configured to limit a slide movement, in an insertion direction, of the controller-side slide portion which has been inserted from the first side of the attachment-side slide portion; and a strap anchor on the first side, wherein a strap can be fastened to the strap anchor.

27. The attachment according to claim 24, wherein:
the attachment further comprises a housing with a hole;
the strap anchor is a shaft inside the housing; and
the attachment further comprises a strap fastened to the shaft and extending out of the housing through the hole.

28. The attachment according to claim 25, further comprising a lock portion configured to resist a slide movement, in a removal direction opposite to the insertion direction, while the slide movement of the controller-side slide portion is substantially limited by the stopper portion.

29. The attachment according to claim 28, wherein:
the lock portion is on the first side of the center of the attachment-side slide portion, and has a shape configured to engage with a projection on the game controller while the slide movement of the controller-side slide portion is substantially limited by the stopper portion.

30. The attachment according to claim 29, the attachment-side slide portion including:
a bottom surface substantially parallel to the slide direction;
two side surfaces each substantially parallel to the slide direction and extending from opposite sides of the bottom surface; and
two opposing portions extending from the two side surfaces, respectively, and each having a surface opposing the bottom surface,
wherein the lock portion is part of each of the two opposing portions.

31. The attachment according to claim 30, wherein:
the lock portion includes a contact surface with which a surface of the projection that is facing the first side is in contact while the slide movement of the controller-side slide portion is substantially limited by the stopper portion; and
the contact surface is part of a boundary of a gap between the two opposing portions that gradually narrows toward the first side.

32. The attachment according to claim 28, wherein the lock portion includes a projection on the first side of the center of the attachment-side slide portion, and the projection is configured to engage with the controller-side slide portion while the slide movement is substantially limited by the stopper portion.

33. The attachment according to claim 32, wherein the projection includes a surface on the first side and sloped so that a height of surface relative to the first side gradually decreases toward the first side.

34. The attachment according to claim 32, wherein:
the projection is movable between a fifth position and a sixth position;
the projection in the fifth position protrudes more than the projection in the sixth position, thereby engaging with the controller-side slide portion while the slide movement is substantially limited by the stopper portion;
the attachment further comprises an operation section movable between a seventh position and a eighth position through an operation by a user; and
the operation section in the seventh position limits movement of the projection from the fifth position to the sixth position, and the operation section in the eighth position allows the projection to move from the fifth position to the sixth position.

35. The attachment according to claim 34, wherein:
a direction of movement of the projection from the fifth position to the sixth position is substantially perpendicular to a direction of movement of the operation section from the seventh position to the eighth position; and
the operation section in the seventh position is in contact with the projection in the fifth position, thereby limiting the movement of the projection from the fifth position to the sixth position, and the operation section in the eighth position is not in contact with the projection in the fifth position.

36. The attachment according to claim 22, wherein the attachment-side slide portion is a rail member that extends along the slide direction.

37. The attachment according to claim 22, wherein the attachment-side slide portion is metal.

38. The attachment according to claim 22, the attachment-side slide portion including:
a bottom surface substantially parallel to the slide direction;
two side surfaces each substantially parallel to the slide direction and extending from opposite sides of the bottom surface; and
two opposing portions extending from the two side surfaces, respectively, and each having a surface opposing the bottom surface,
wherein end portions of the two opposing portions on the first side are tapered so that a gap therebetween gradually increases toward a distal end.

39. The attachment according to claim 25, further comprising an elastic member on a bottom surface of the attachment-side slide portion, wherein the elastic member is configured to apply a force, in a direction away from the bottom surface, on the controller-side slide portion while the slide movement is substantially limited by the stopper portion.

40. The attachment according to claim 39, wherein the elastic member is on the second side of the center of the attachment-side slide portion.

41. The attachment according to claim 22, wherein an area of an operation surface of the attachment-side first operation button is larger than an area of the controller-side first operation button.

42. The attachment according to claim 22, wherein a tip of the first actuation portion has a curved surface.

43. The attachment according to claim 22, wherein the first actuation portion has a cross-shaped cross section along a plane perpendicular to a direction of movement from the first position to the second position.

44. The attachment according to claim 22, wherein opposite end portions of the second surface in the slide direction are each a rounded curved surface.

45. The attachment according to claim 22, further comprising:
a light-receiving port on a bottom surface of the attachment-side slide portion;
a light-exiting port on a surface of the attachment different from the bottom surface of the attachment-side slide portion; and
a lightguide portion configured to guide light incident upon the light-receiving port to the light-exiting port.

46. The attachment according to claim 45, wherein the light-exiting port is on the second surface on the reverse side from the first surface.

47. The attachment according to claim 46, further comprising:
an attachment-side second operation button on the second surface; wherein the attachment-side second operation button includes a second actuation portion configured to move from a third position to a fourth position, thereby pressing a controller-side second operation button, in response to an operation of pressing the attachment-side second operation button; and the light-exiting port is on the second surface between the attachment-side first operation button and the attachment-side second operation button.

48. A control system comprising a game controller and an attachment which is attachable to the game controller, wherein:

the game controller includes:
 a controller-side slide portion; and
 a controller-side operation button on the controller-side slide portion;

the attachment includes:
 an attachment-side slide portion on a first surface of the attachment, the attachment-side slide portion having a first side and a second side opposite to each other in a predetermined slide direction, wherein the attachment-side slide portion is configured to slidably engage with the controller-side slide portion in the slide direction, and wherein the controller-side slide portion is insertable into the attachment-side slide portion from the first side; and
 an attachment-side operation button on a second surface on a reverse side from the first surface; and the attachment-side operation button includes:
 an actuation portion configured to move from a first position to a second position that extends into the attachment-side slide portion, thereby pressing the controller-side operation button, in response to an operation of pressing the attachment-side operation button.

49. The attachment according to claim 26, wherein the strap anchor is on an end of the attachment opposite the second side.

* * * * *